(12) United States Patent  
Jiang et al.

(10) Patent No.: US 11,989,580 B2
(45) Date of Patent: *May 21, 2024

(54) SYSTEM AND METHOD TO ACCELERATE REDUCE OPERATIONS IN GRAPHICS PROCESSOR

(71) Applicant: Intel Corporation, Santa Clara, CA (US)

(72) Inventors: Yong Jiang, Shanghai (CN); Yuanyuan Li, Shanghai (CN); Jianghong Du, Shanghai (CN); Kuilin Chen, Hillsboro, OR (US); Thomas A. Tetzlaff, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/197,304

(22) Filed: Mar. 10, 2021

(65) Prior Publication Data

US 2021/0334127 A1 Oct. 28, 2021

Related U.S. Application Data

(63) Continuation of application No. 16/066,652, filed as application No. PCT/CN2016/078265 on Apr. 1, 2016, now Pat. No. 10,949,251.

(51) Int. Cl.
*G06F 9/48* (2006.01)
*G06F 9/30* (2018.01)
(Continued)

(52) U.S. Cl.
CPC .......... *G06F 9/4843* (2013.01); *G06F 9/3009* (2013.01); *G06F 9/522* (2013.01);
(Continued)

(58) Field of Classification Search
None
See application file for complete search history.

(56) References Cited

U.S. PATENT DOCUMENTS

| 5,574,849 A | 11/1996 | Sonnier |
| 7,523,123 B2 | 4/2009 | Yang et al. |
| (Continued) | | |

FOREIGN PATENT DOCUMENTS

| CN | 101799808 A | 8/2010 |
| CN | 102982389 A | 3/2013 |
| CN | 104536937 A | 4/2015 |

OTHER PUBLICATIONS

Fatourou, P. et al., Revisiting the Combining Synchronization Technique, 2012, IEEE, pp. 257-266. (Year: 2012).*

(Continued)

*Primary Examiner* — Eric Coleman
(74) *Attorney, Agent, or Firm* — Jaffery Watson Mendonsa & Hamilton LLP

(57) ABSTRACT

Embodiments described herein provide a system, method, and apparatus to accelerate reduce operations in a graphics processor. One embodiment provides an apparatus including one or more processors, the one or more processors including a first logic unit to perform a merged write, barrier, and read operation in response to a barrier synchronization request from a set of threads in a work group, synchronize the set of threads, and report a result of an operation specified in association with the barrier synchronization request.

20 Claims, 21 Drawing Sheets

(51) Int. Cl.
*G06F 9/52* (2006.01)
*G06T 1/20* (2006.01)
*G06F 8/41* (2018.01)

(52) U.S. Cl.
CPC ............... *G06T 1/20* (2013.01); *G06F 8/458* (2013.01); *G06F 9/30087* (2013.01)

(56) References Cited

U.S. PATENT DOCUMENTS

| | | |
|---|---|---|
| 2007/0074207 A1 | 3/2007 | Bates |
| 2008/0320485 A1 | 12/2008 | Joffe |
| 2014/0082234 A1 | 3/2014 | Gopalakrishnan |
| 2014/0108489 A1 | 4/2014 | Glines |
| 2014/0215487 A1* | 7/2014 | Cherkasova .......... G06F 9/5066 718/106 |
| 2015/0086134 A1 | 3/2015 | Hameed |
| 2015/0277955 A1 | 10/2015 | Iwamatsu |
| 2016/0098662 A1* | 4/2016 | Voss ................ G06Q 10/06316 705/7.26 |
| 2017/0147943 A1 | 5/2017 | Boehm |
| 2017/0169336 A1* | 6/2017 | Singhal ............... G06F 16/9024 |

OTHER PUBLICATIONS

Xiao, S. et al., Inter-Block GPU Communication via Fast Barrier Synchronization 2010, IEEE, 12 pages. (Year: 2010).*

Fan, Kuo-Pao, et al., Turn Grouping for Efficient Barrier Synchronization in Wormhole Mesh Networks, 1997, IEEE, pp. 190-197. (Year: 1997).*

International Preliminary Report on Patentability received for PCT Patent Application No. PCT/CN2016/078265, dated Oct. 11, 2018, 5 pages.

State IP Office of PR China—International Search Report of the International Searching Authority dated Dec. 29, 2016 for International Application No. PCT/CN2016/078265 (4 pgs).

State IP Office of PR China—Written Opinion of the International Searching Authority dated Dec. 29, 2016 for International Application No. PCT/CN2016/078265 (3 pgs).

Xiao, s., et al., "Inter-Block GPU Communication via Fast Barrier Synchronization". IEEE International Symposium on parallel & distributed processing (IPDPS) Apr. 12, 2010, 2 pages.

* cited by examiner

SYSTEM AND METHOD TO ACCELERATE REDUCE OPERATIONS IN GRAPHICS PROCESSOR

CLAIM TO PRIORITY

This application is a continuation and claims the benefit of and priority to U.S. application Ser. No. 16/066,652, entitled SYSTEM AND METHOD TO ACCELERATE REDUCE OPERATIONS IN GRAPHICS PROCESSOR, by Yong Jiang, filed Jun. 27, 2018, now allowed, which claims the benefit and priority to U.S. National Phase Application under 35 U.S.C. § 371 of International Application No. PCT/CN2016/078265, entitled SYSTEM AND METHOD TO ACCELERATE REDUCE OPERATIONS IN GRAPHICS PROCESSOR, by Yong Jiang, filed Jan. 4, 2016, the entire contents of which are incorporated herein by reference.

TECHNICAL FIELD

Embodiments generally relate to processing logic. More particularly, embodiments relate to accelerating reduce operations in a graphics processor.

BACKGROUND

Map and Reduce is a programming model and an associated implementation for processing and generating large data sets with a parallel, distributed algorithm. Map/Reduce jobs typically include a map function that operates on a set of input data to produce intermediate data and a reduce function which combines the intermediate data into a collection using an associated multiple-in-one-output operation. The reduce function is widely used in many algorithms to compute error metrics and termination conditions for iterative algorithms, such as LDPC (Low Density Parity Check) decoding and linear solver.

Map/Reduce can be implemented in a GPGPU or heterogeneous programming model. For example, using OpenCL, a compute kernel can be can be executed on multiple processors. Each thread of the kernel is a work item, where multiple work items are organized into a workgroup. For Map/Reduce, each work item performs a map computation, while the reduction is performed within a work group.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
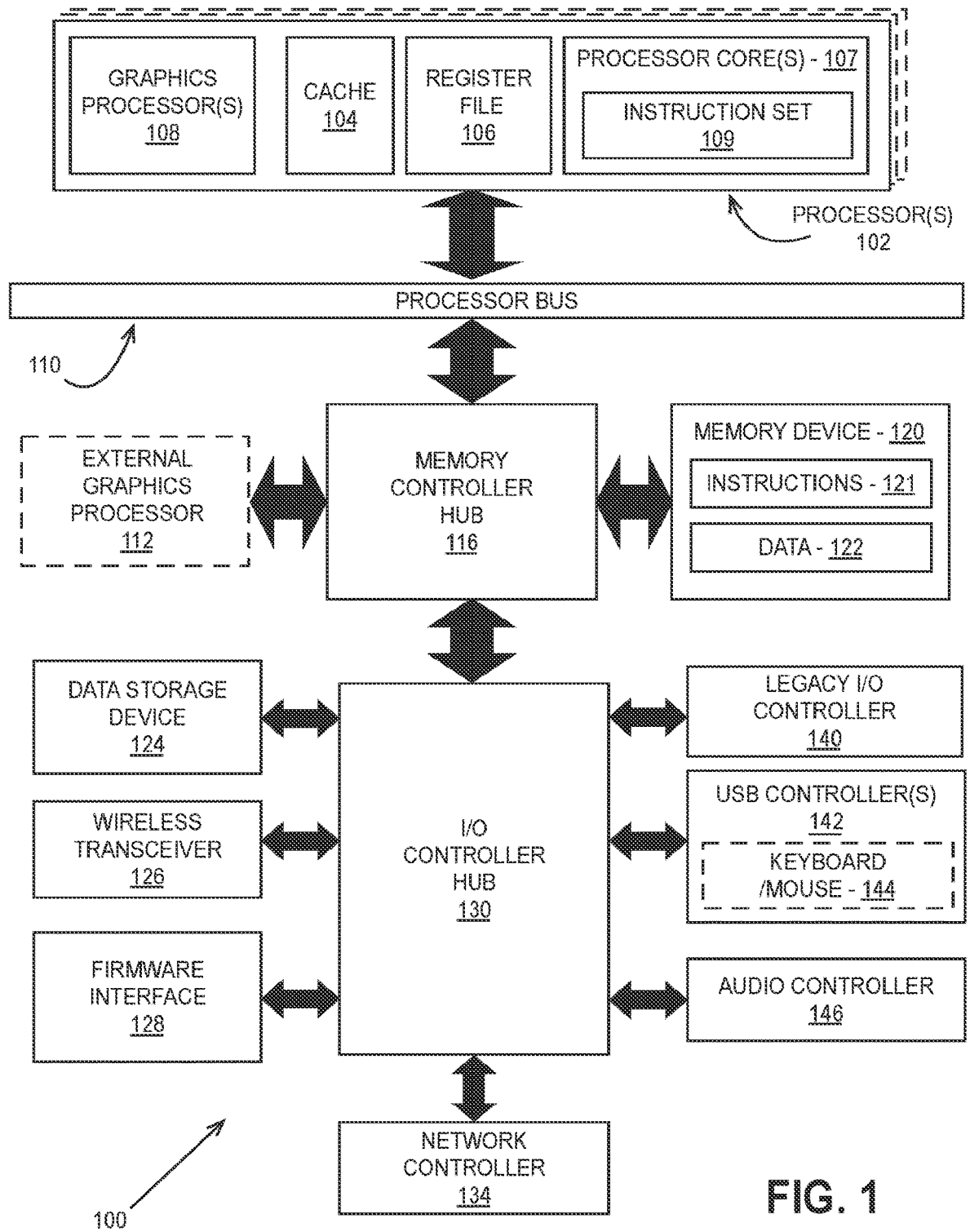
FIG. 1 is a block diagram of an embodiment of a computer system with a processor having one or more processor cores and graphics processors.

Embodiments described herein provide a system and method to accelerate reduce operations in a graphics processor. The traditional approach for scheduling the map and reduce tasks across resources is to utilize a barrier synchronization between the map phase and the reduce phase, such that the reduce phase starts once the map tasks are completed. The reduce phase includes one write, one barrier and one read operation. The write operation sends a local value for global calculation, while the read operation is to read the global result. The write and read operation of the reduce phase can introduce a large amount of I/O into the processing operation, which can significantly reduce the performance of the reduce operation. To resolve this issue, embodiments described herein provide a system and method to eliminate the read and write operation in the reduce phase by merging the read and write operations into the barrier function.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-21 provide specific details of the various embodiments. Although some of the following embodiments are described with reference to a graphics processor, similar techniques and teachings can be applied to other types of circuits or semiconductor devices, including general purpose processors or many integrated core processors, as the teachings are applicable to any processor or machine that manipulates or processes image or vertex data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
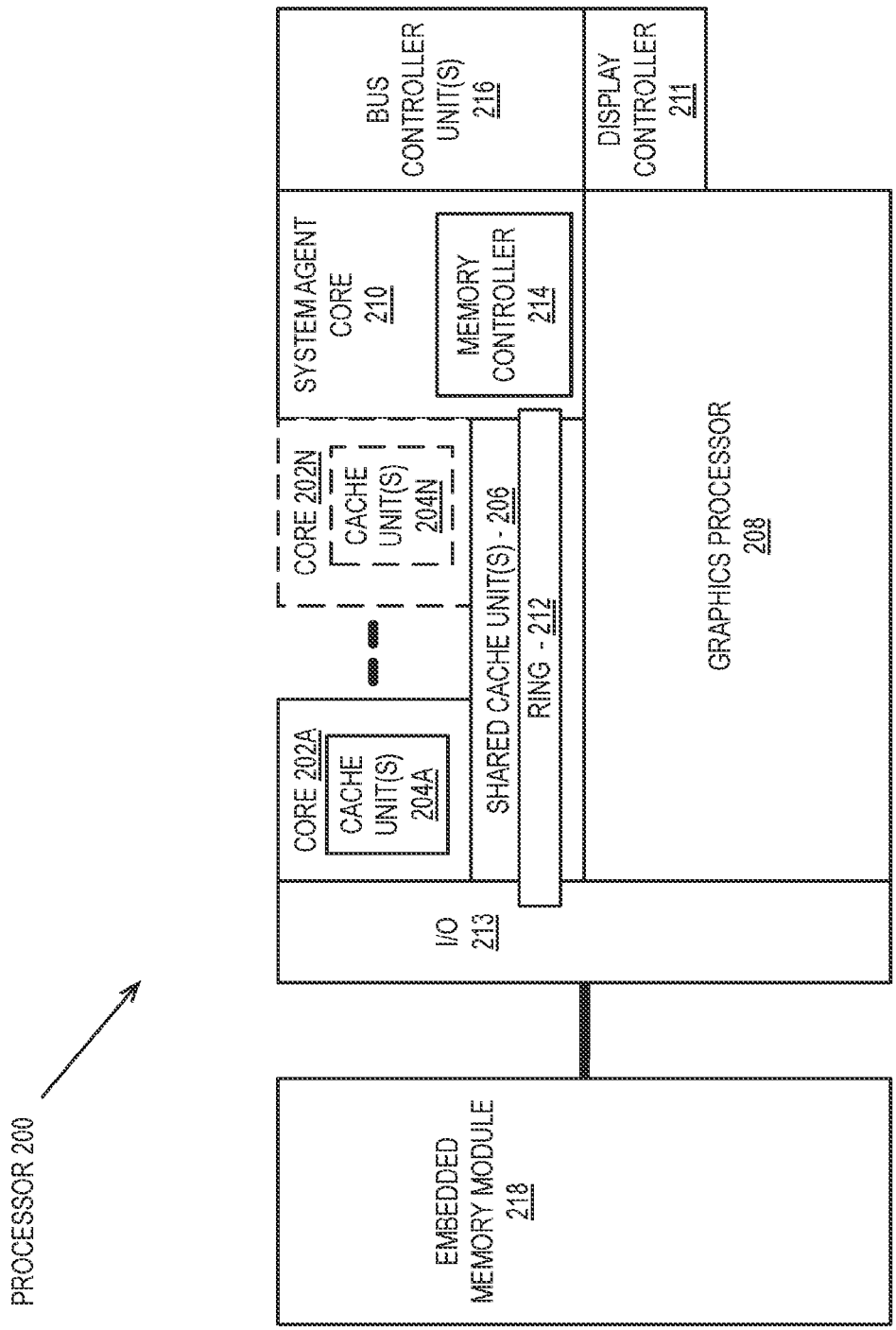
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
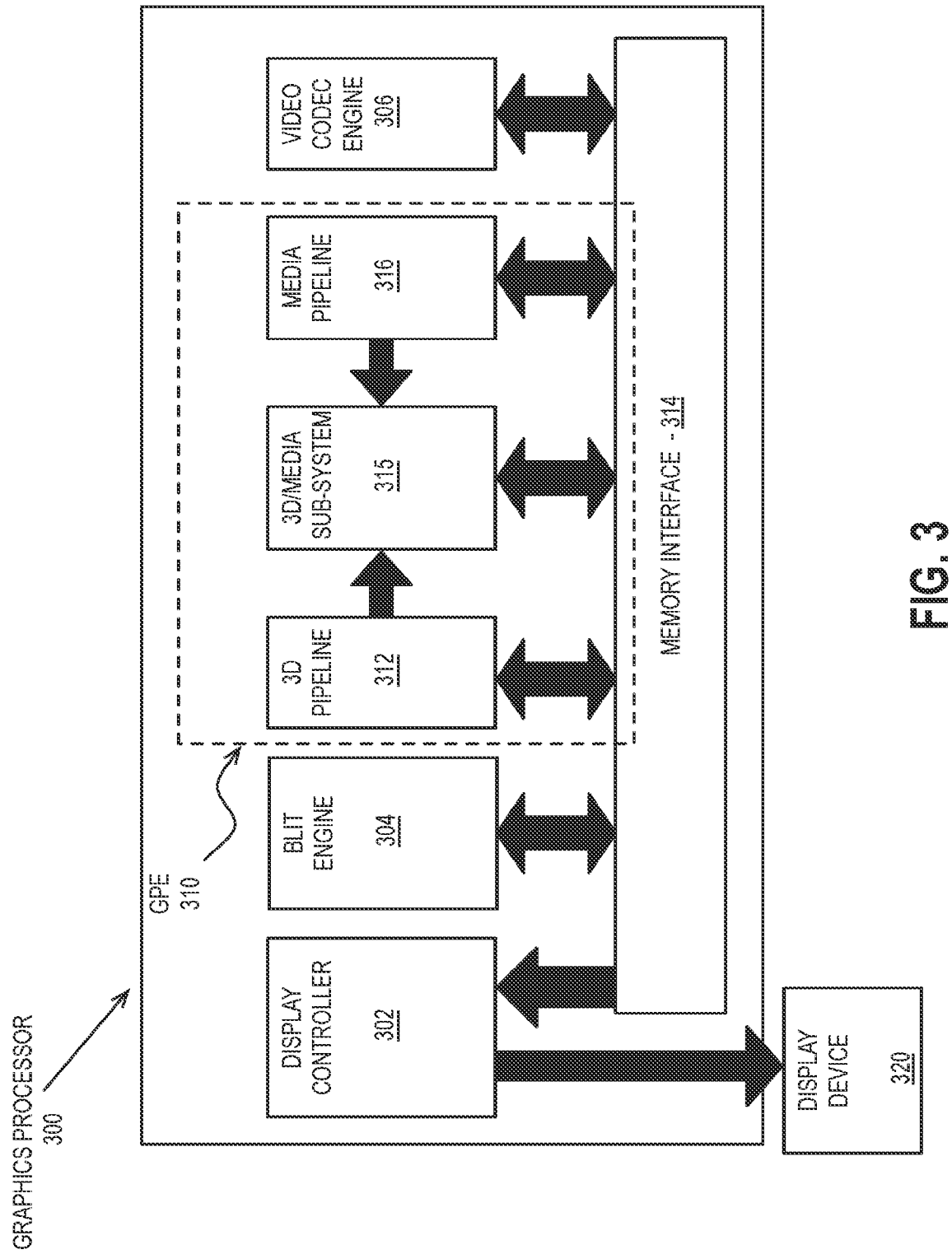
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
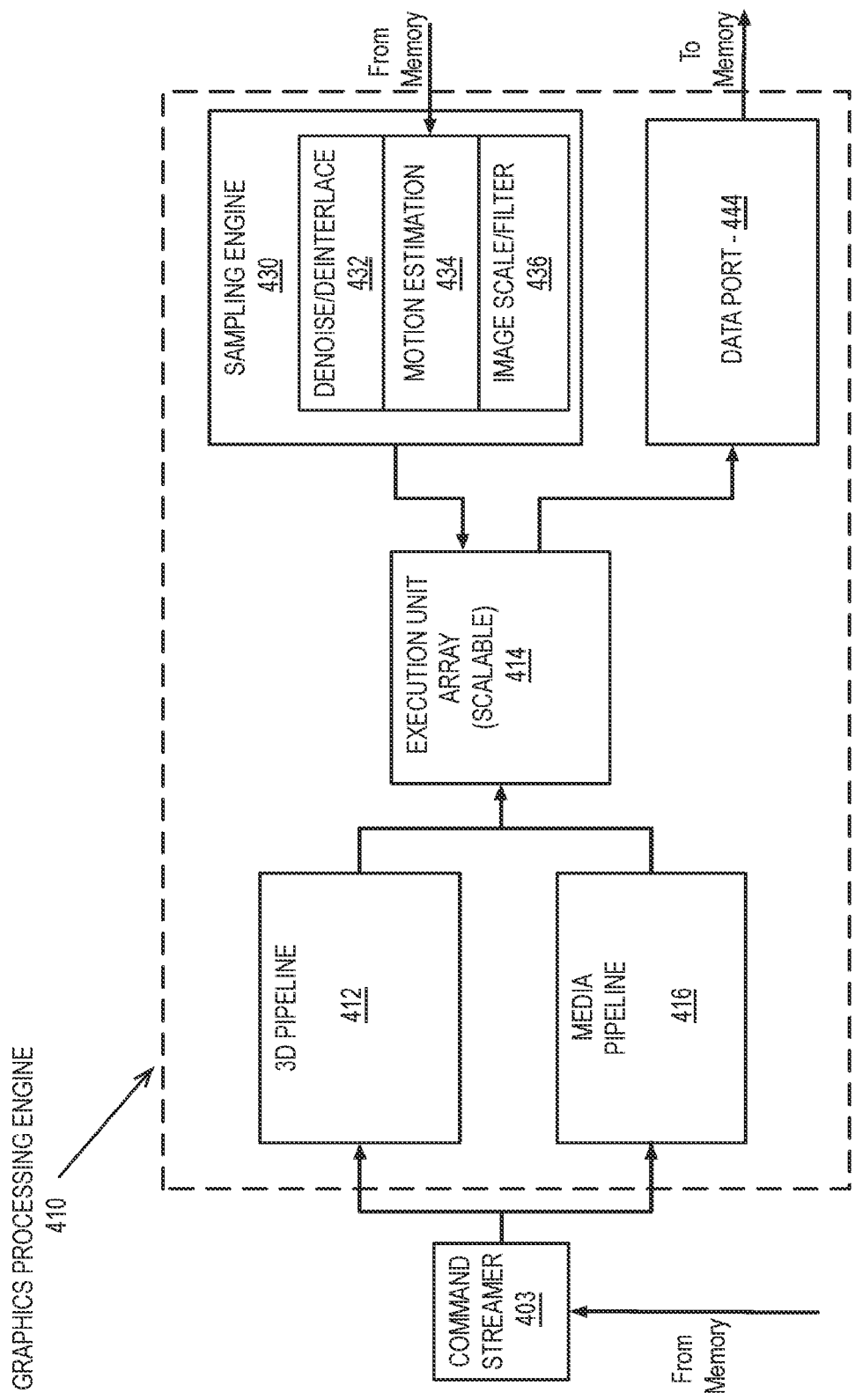
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
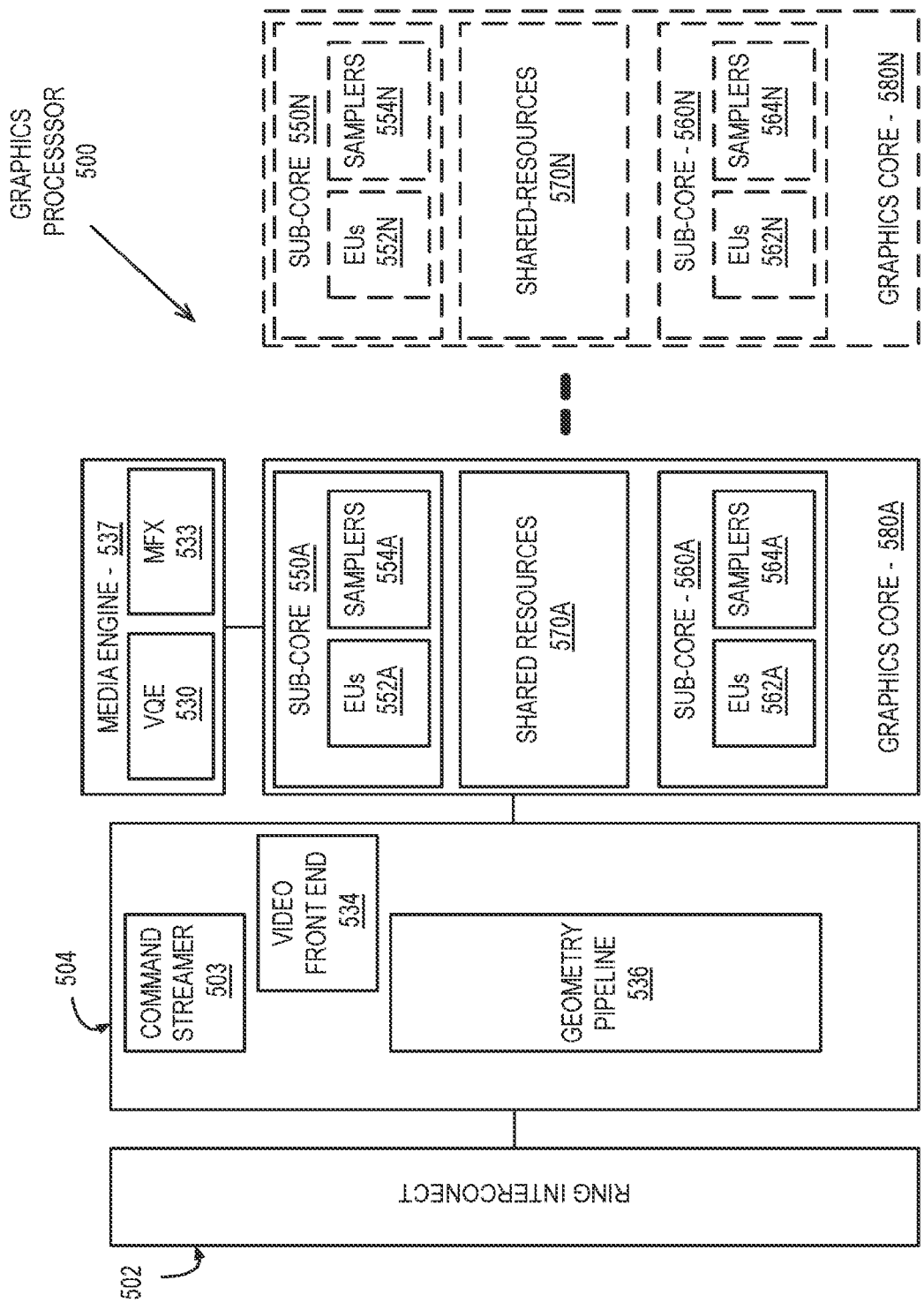
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
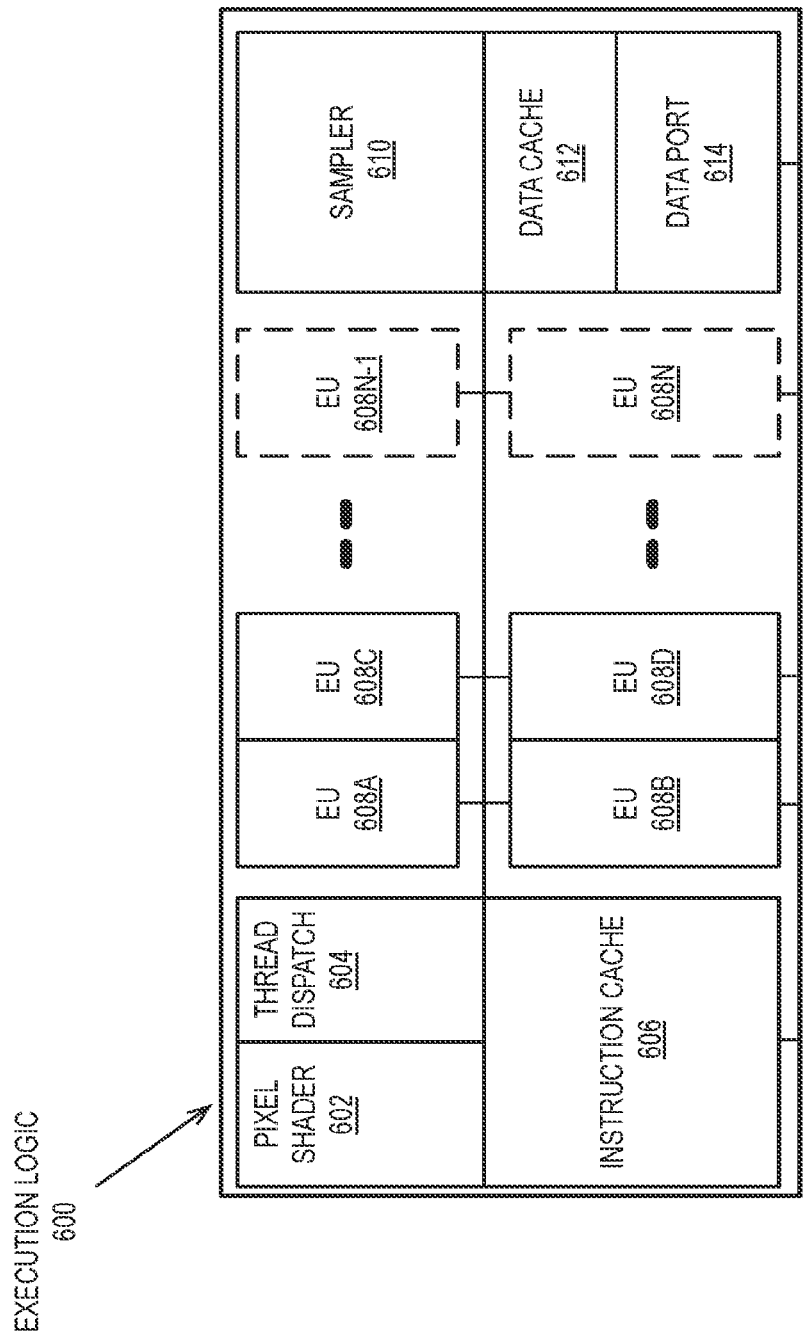
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
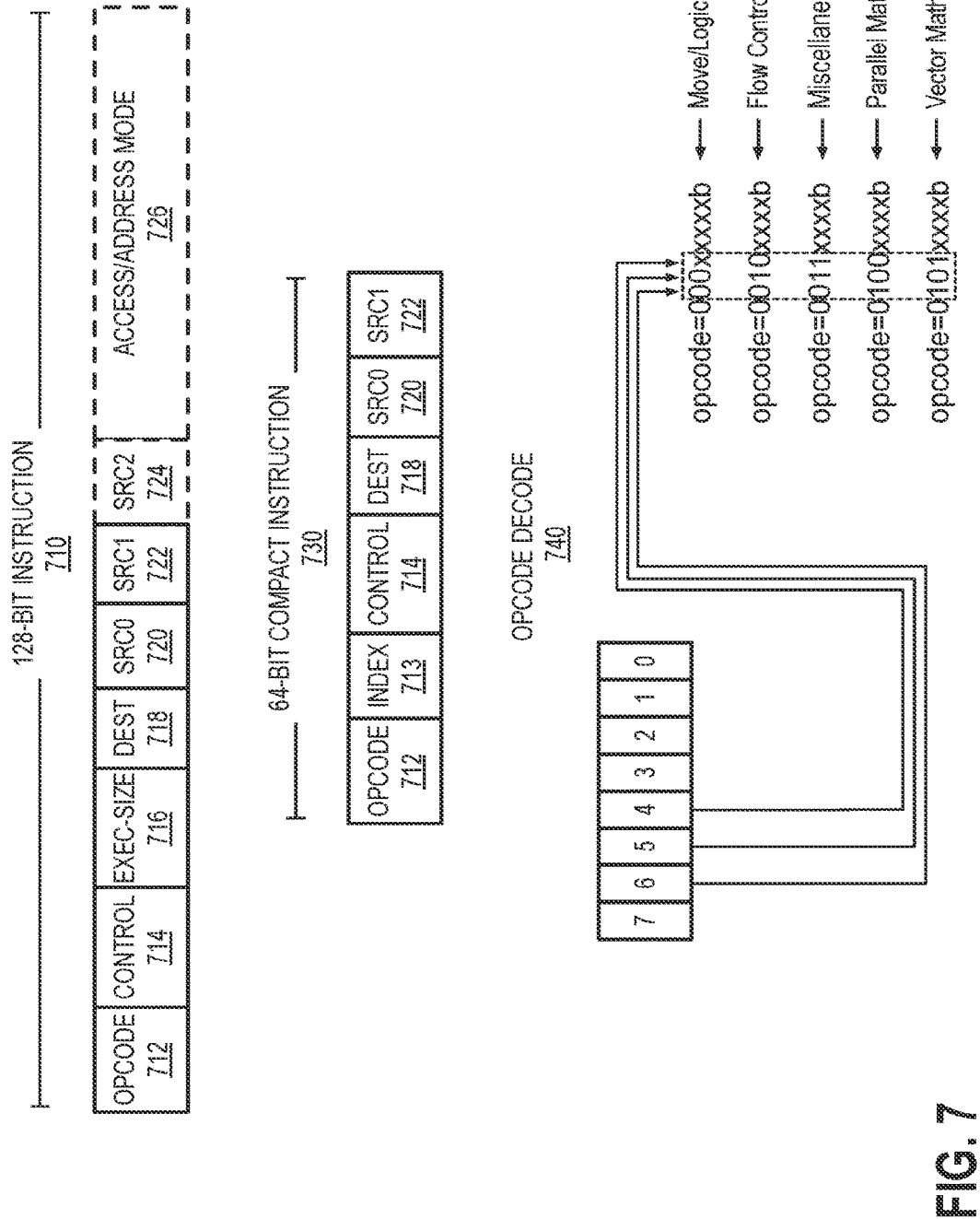
FIG. 7 illustrates graphics processor execution unit instruction formats according to an embodiment.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, the graphics processor instruction formats 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
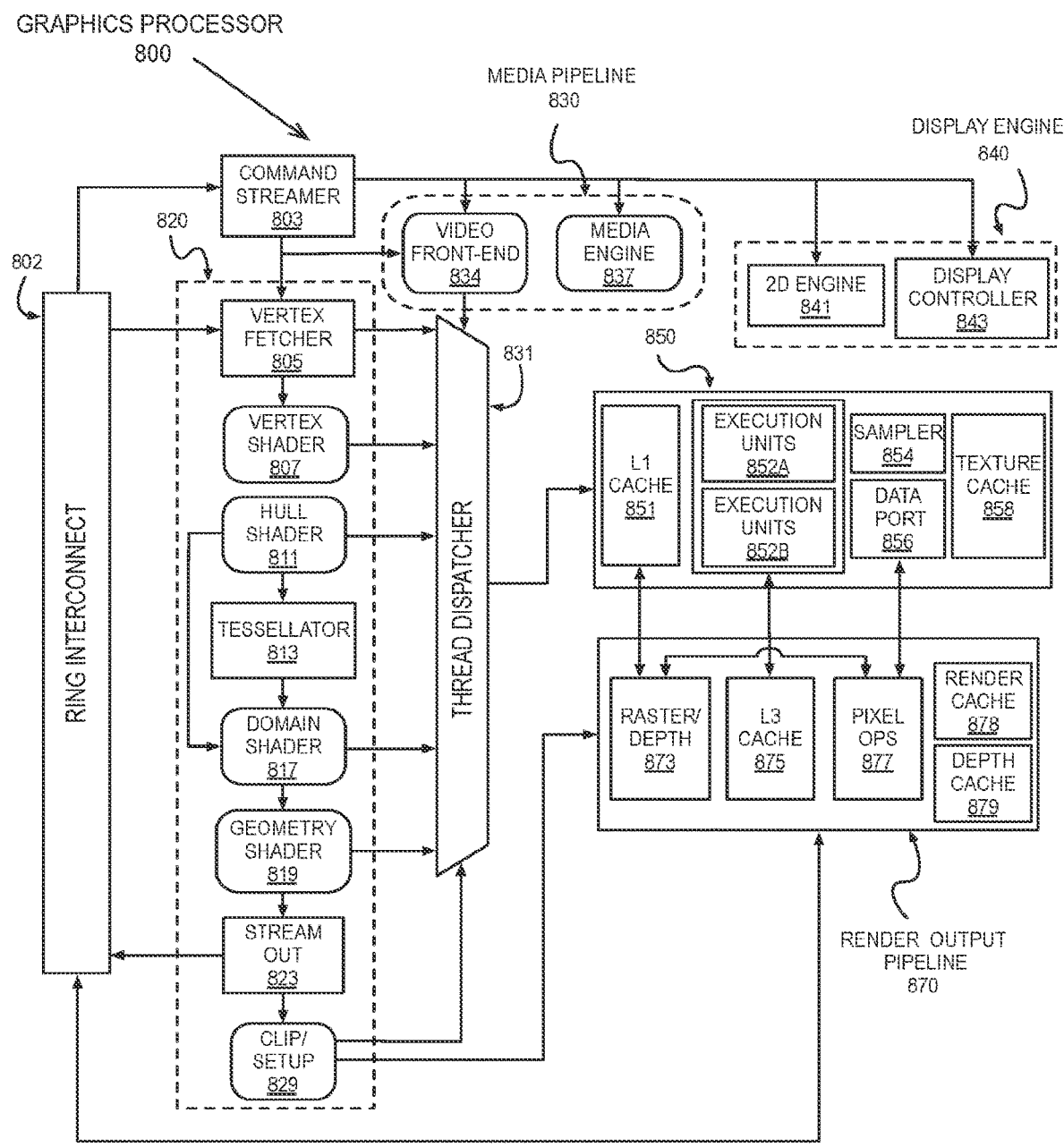
FIG. 8 is a block diagram of another embodiment of a graphics processor which includes a graphics pipeline, a media pipeline, a display engine, thread execution logic, and a render output pipeline.
Figure 9:
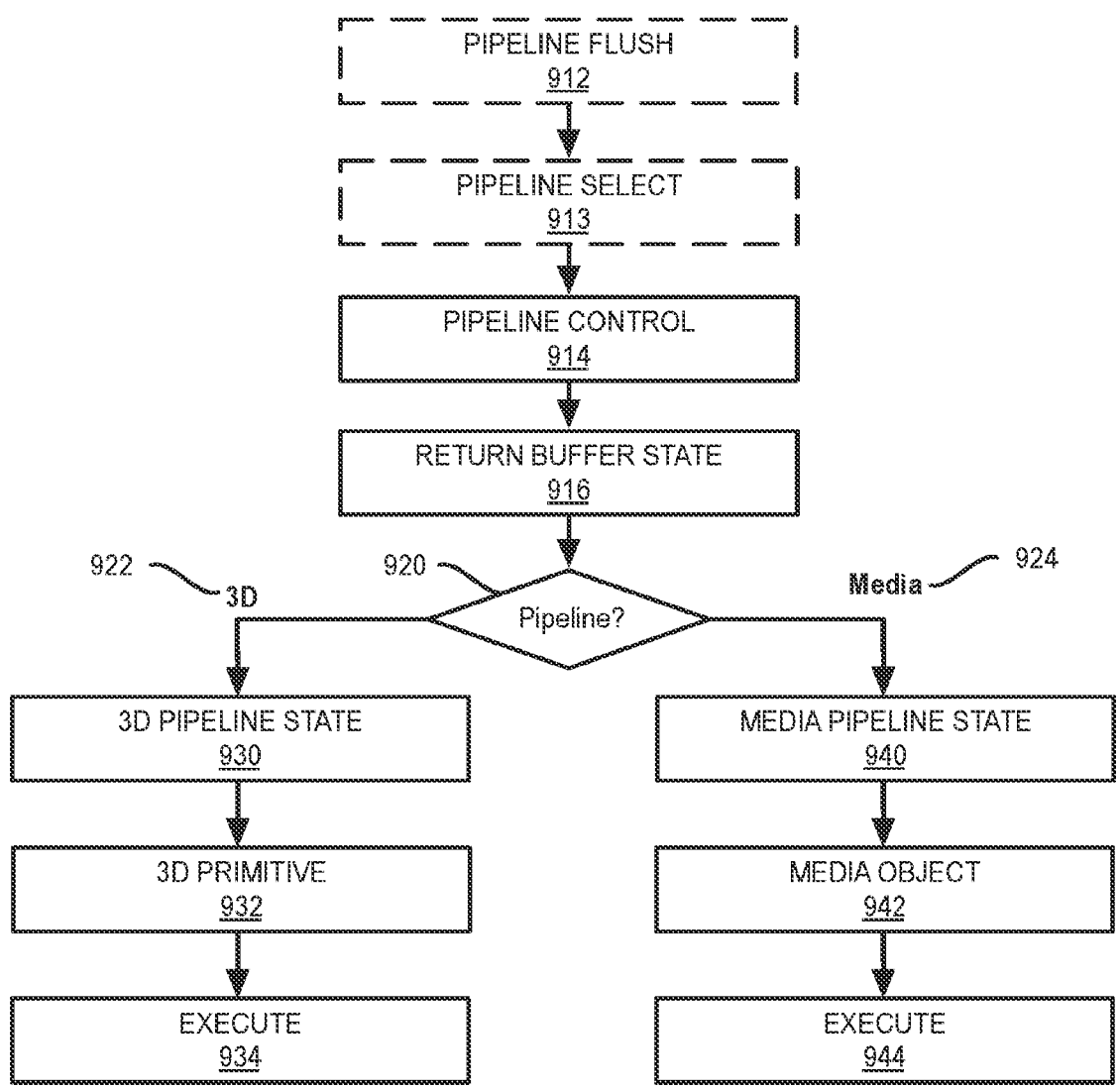
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
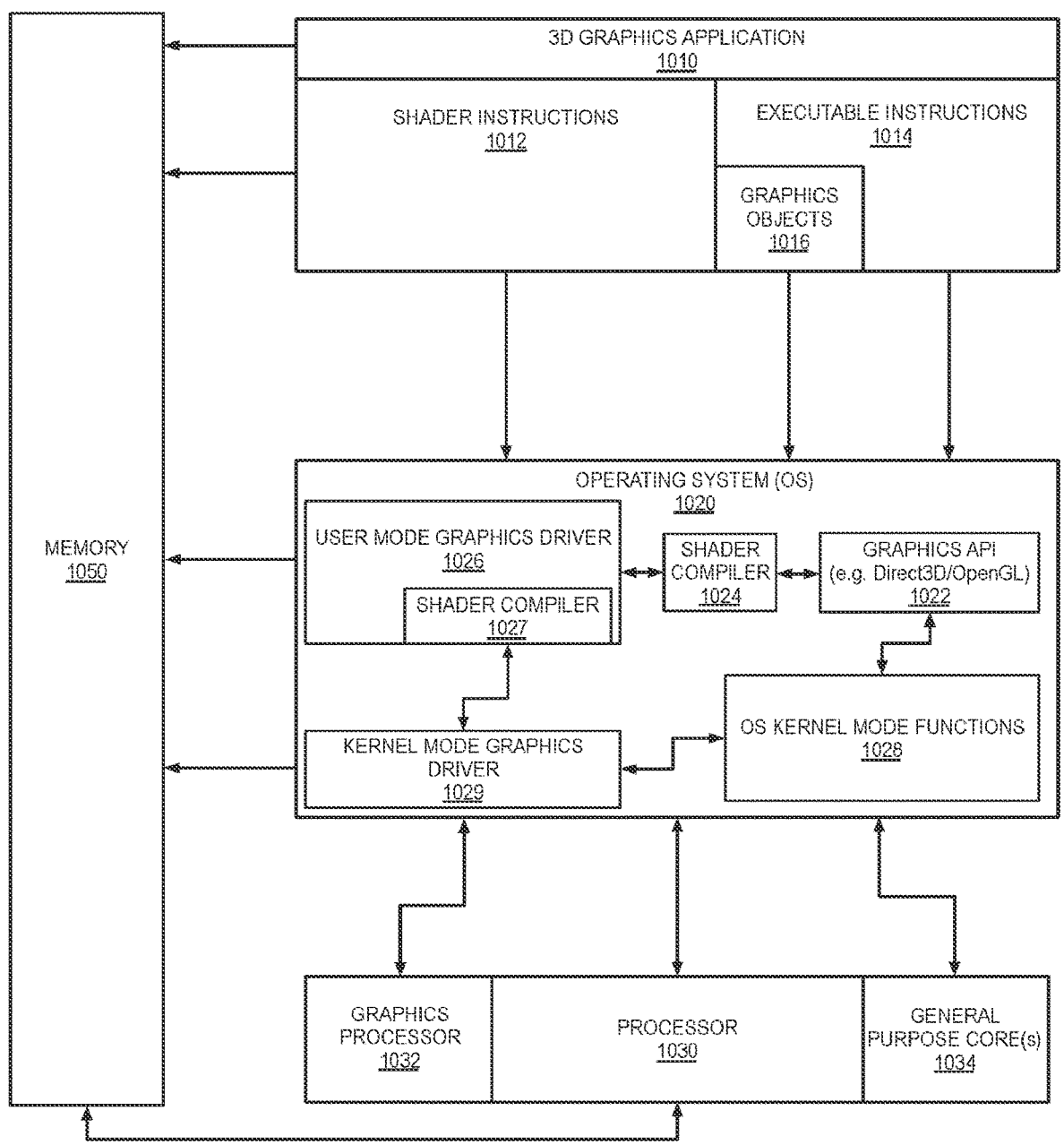
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
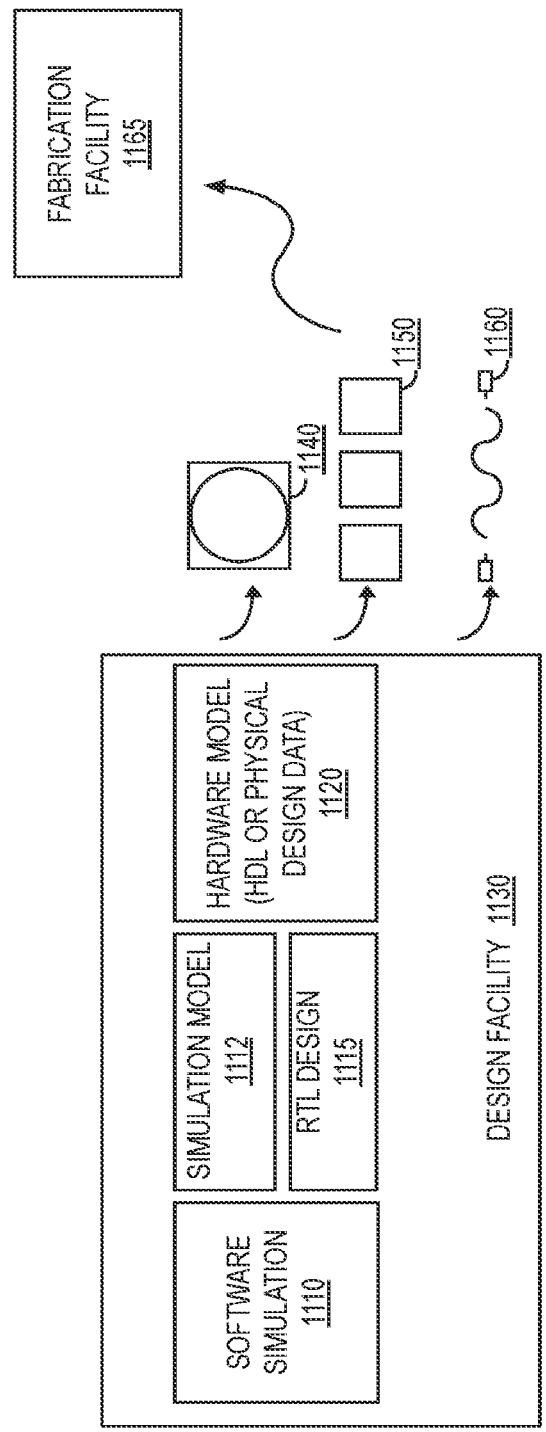
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
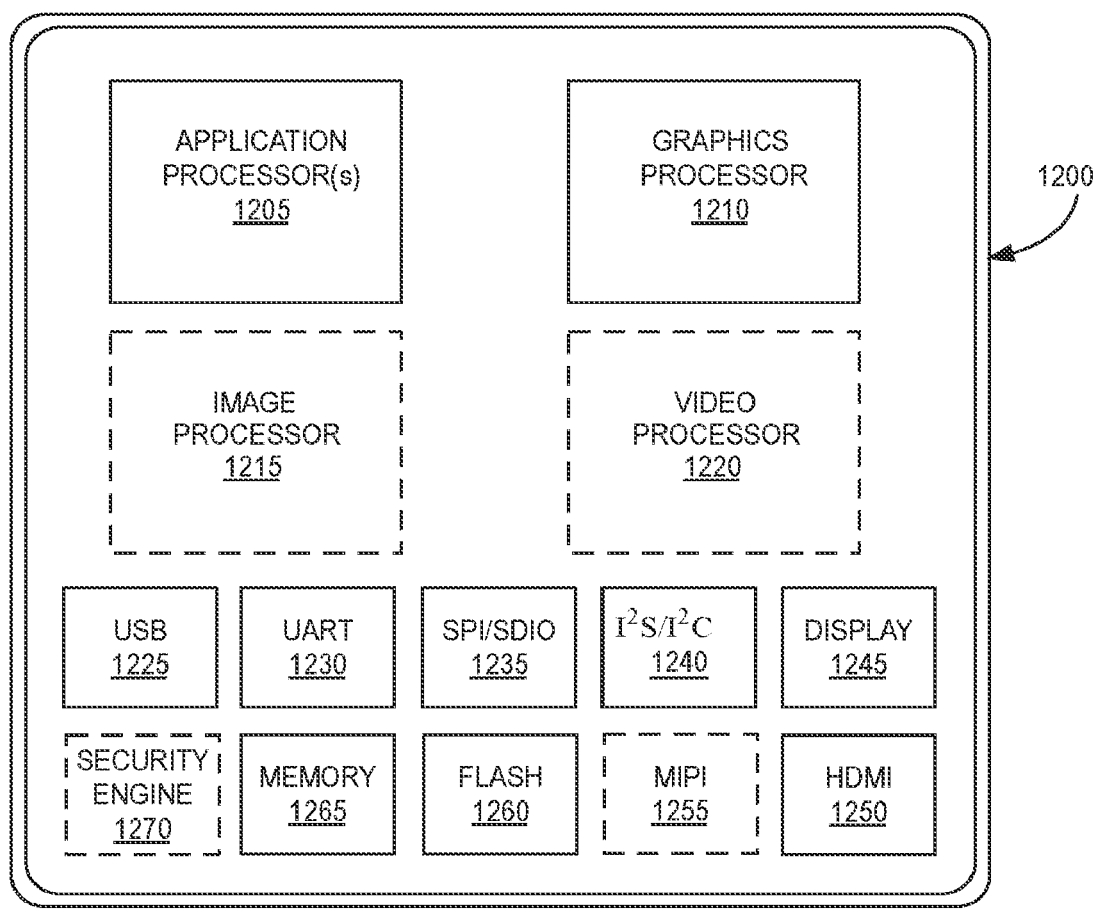
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

The traditional approach for scheduling the map and reduce tasks across resources is to utilize a barrier synchronization between the map phase and the reduce phase, such that the reduce phase starts once the map tasks are completed. The reduce phase includes one write, one barrier and one read operation. The write operation sends a local value for global calculation, while the read operation is to read the global result. The write and read operation of the reduce phase can introduce a large amount of I/O into the processing operation, which can significantly reduce the performance of the reduce operation. To resolve this issue, embodiments described herein provide a system and method to eliminate the read and write operation in the reduce phase by merging the read and write operations into the barrier function.

Figure 13:
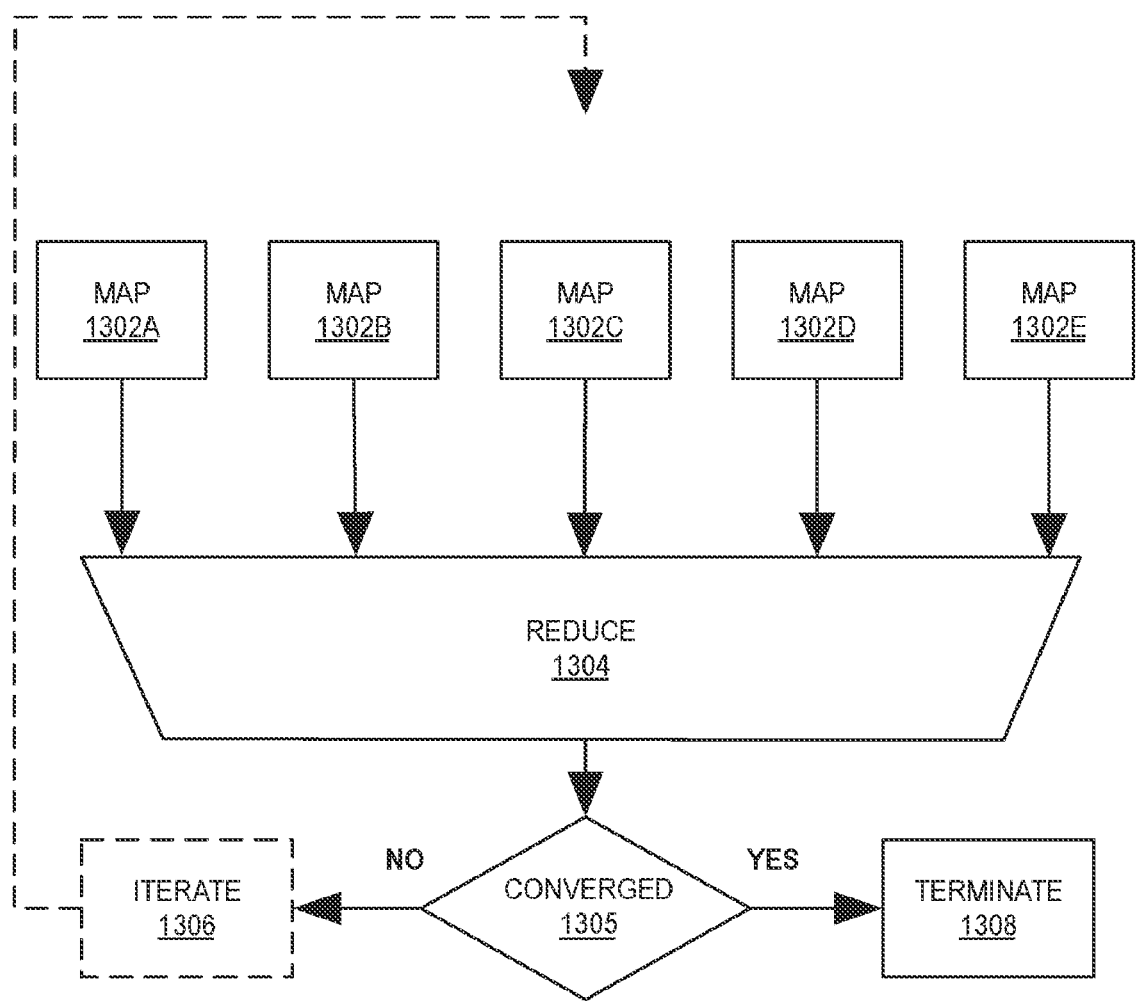
FIG. 13 is an overview of map and reduce operations.

FIG. 13 is an overview of map and reduce operations 1300. Multiple compute nodes perform map operations 1302A-1302E, which perform independent computations on distributed data. The map operations 1302A-1302E output into a reduce operation 1304, which combines the data output by the map operations in a collection using a multiple-input-one-output operation. The reduce operation 1304 can be used to compute error metrics and termination conditions for iterative algorithms.

The map operations 1302A-1302E and the reduce operation 1304 may be performed iteratively until the reduced output meets convergence criteria. The result from the reduce operation 1304 can be checked against the convergence criteria 1305 and operations can terminate 1308 if the criteria is met. If the criteria is not met, the map and reduce logic may iterate 1306 until the convergence criteria is met or a maximum number of iterations is reached. Once the maximum number of iterations is met, operations can terminate 1308.

In GPGPU programing, for example, using the OpenCL language, typically each work item performs a map computation and reduction happens within a work group. In OpenCL, a compute unit executes a work-group, which is a group or related work-items. A work-item is a collection of parallel executions of a kernel. A kernel is a function declared in a program and executed on an OpenCL device. While OpenCL is described, these concepts are also applicable to any computational language, including other GPGPU languages or programming models or multi-core/many integrated core compute models.

Figure 14:
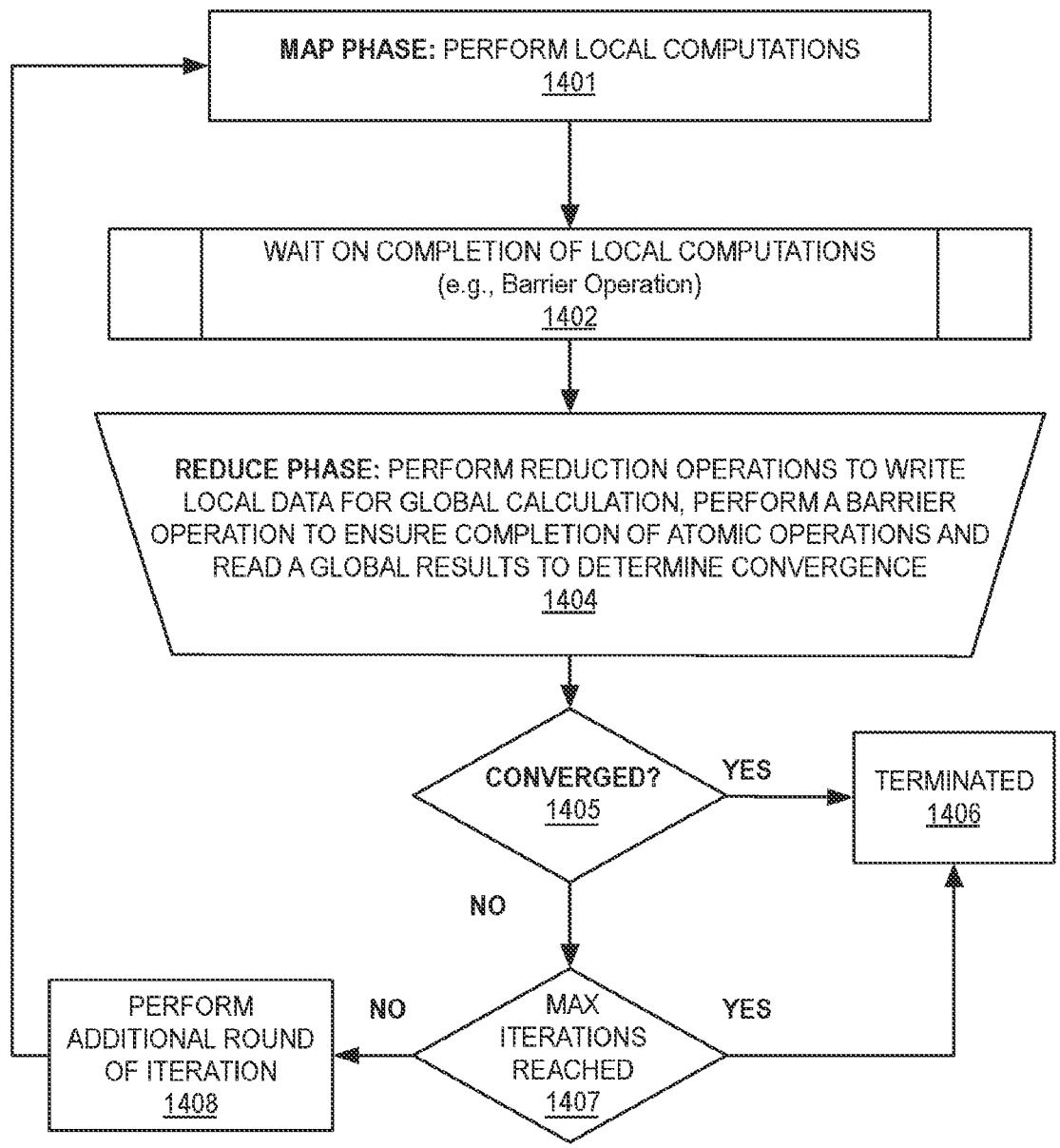
FIG. 14 is a flow diagram of exemplary map and reduce kernel logic.

FIG. 14 is a flow diagram of exemplary map and reduce kernel logic 1400, for example, as used in GPGPU programming. As shown at block 1401, a map phase is performed in which multiple threads are executed in parallel to perform local computations. The threads used to perform local computes are synchronized at block 1402, in which the map and reduce logic 1400 waits on the completion of the local computations. For example, a barrier operation can be performed to make ensure that all map threads have completed local computations.

As shown at block 1404, a reduce phase can be performed in which each map thread sends a local value, for example, using atomic functions, to calculate the global result. In a conventional map/reduce program, the logic for the reduce stage includes operations to write local data for global computation, perform a barrier operation to ensure completion of the global computation, and read a global result to determine whether the result meets the convergence condition.

The logic can determine if the global result satisfies the convergence condition at 1405. If the algorithm is converged, the kernel will terminate at block 1406. Otherwise, the kernel will determine if the maximum number of iterations have been reached at 1407. If the maximum number of iterations has not been reached, the kernel can perform an additional round of iteration, as shown at block 1408. If the maximum number of iterations has been reached the kernel will terminate at block 1406. Exemplary program logic for a simple iterative kernel is shown in Table 1. The iterative kernel shown uses the accumulated error as the termination criteria

TABLE 1

Exemplary Iterative Kernel

```
__kernel ( )
{
    for (iter = 0; iter<MAX_ITERATION; iter++)
    {
        local_error = local_map_computation( );
        work_group_barrier(CLK_LOCAL_MEM_FENCE);
        atomic_add(global_error, local_error);
        // Write: send local data for global computation
        work_group_barrier(CLK_LOCAL_MEM_FENCE);
        // Barrier: sync for convergence decision
        if (global_error < THRESHOLD){ //Read: read global result
            converged = 1;
            break;
        }
    }
}
```

An examination of the exemplary iterative kernel of Table 1 reveals that, during the reduce phase, write, barrier and read operations are performed. The write operation sends the local value for global calculation while the read operation is to read out the global result. Such operations may cause a large number of I/O operations to be performed, which can increase the computational cost of the compute operations.

In embodiments described herein, reduce phase I/O operations can be reduced by introducing additional logic to computational hardware to eliminate the explicit read and write operations in the reduce phase by merging the read and write operations into the barrier function.

One embodiment provides for a work_group_barrier_key function group that includes multiple work-group barrier functions, where each function performs one or more reduction operations, such as add, subtract, logical OR, logical XOR, logical AND, minimum, and/or maximum. For example, for the OpenCL language, a function group can be defined as shown:

work_group_barrier_key (memory_fence_flags, value);

The work_group_barrier_key function indicates a group of functions of generic type to perform a function, such as add (work_group_barrier_add), subtract (work_group_barrier_sub), logical OR (work_group_barrier_or), logical XOR (work_group_barrier_xor), logical AND (work_group_barrier_and), minimum (work_group_barrier_min), maximum (work_group_barrier_max), and/or other logic or arithmetic operations. For example and in one embodiment, additional statistical functions useful in reduce phase convergence testing are supported, including, but not limited to variance, mean, product, and/or difference between minimum and maximum values.

In one embodiment the function group includes an input to define a memory_fence_flag value as input. The memory_fence_flag specified a scope for a fence operation that is used to order loads and stores of work-items executing a kernel, such that loads and stores preceding the indicated memory fence will be committed to memory before any loads and stores following the memory fence. The flags can specify a local or global scope, where the local scope orders operations to local memory and the global scope orders operations to global memory. In addition to the local and/or global fence one embodiment provides logic to support an additional fence flag (e.g., NONE) to indicate that no memory fence is required.

Using the work_group_barrier_key function group, I/O traffic and latency can be greatly reduced, as reduce phase I/O operations can be removed.

Figure 15:
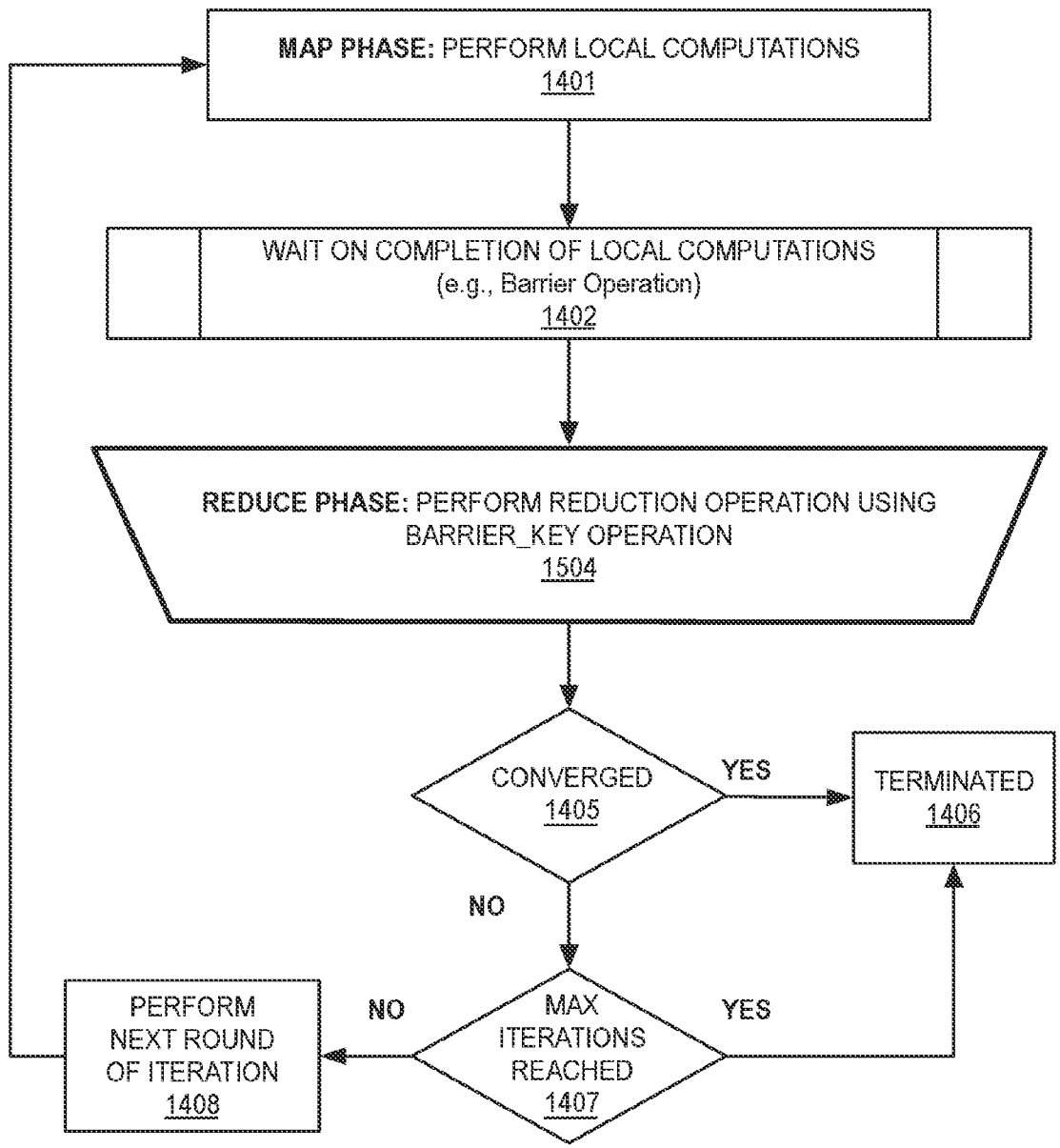
FIG. 15 is a flow diagram of map and reduce kernel using barrier_key logic, according to an embodiment.

FIG. 15 is a flow diagram of map and reduce kernel using barrier_key logic 1500, according to an embodiment. In one embodiment after the map phase at block 1401 and the initial barrier operation at block 1402, a reduce phase can be performed at block 1504 using only the barrier_key operation associated with the desired reduce phase operation. Exemplary program logic for the map and reduce kernel using barrier_key logic 1500 is shown in Table 2.

TABLE 2

Exemplary Kernel Using Barrier_Key logic

```
__kernel ( )
{
    for (iter = 0; iter<MAX_ITERATION; iter++)
    {
        local_error = local_map_computation( );
        work_group_barrier(CLK_LOCAL_MEM_FENCE);
        global_error = work_group_barrier_add(
            CLK_LOCAL_MEM_FENCE,
            local_error);
        if (global_error < THRESHOLD){
            converged = 1;
            break;
```

TABLE 2-continued

Exemplary Kernel Using Barrier_Key logic

```
        }
    }
}
```

Embodiments can provide support in processing logic for the work_group_barrier_key function group within the inter-thread communication and synchronization logic of GPU, vector, or multi-threaded processing logic. The specific implementation details can vary among embodiments, depending on the architecture and/or microarchitecture of the processing logic and the use case targeted for the barrier_key function group.

Figure 16:
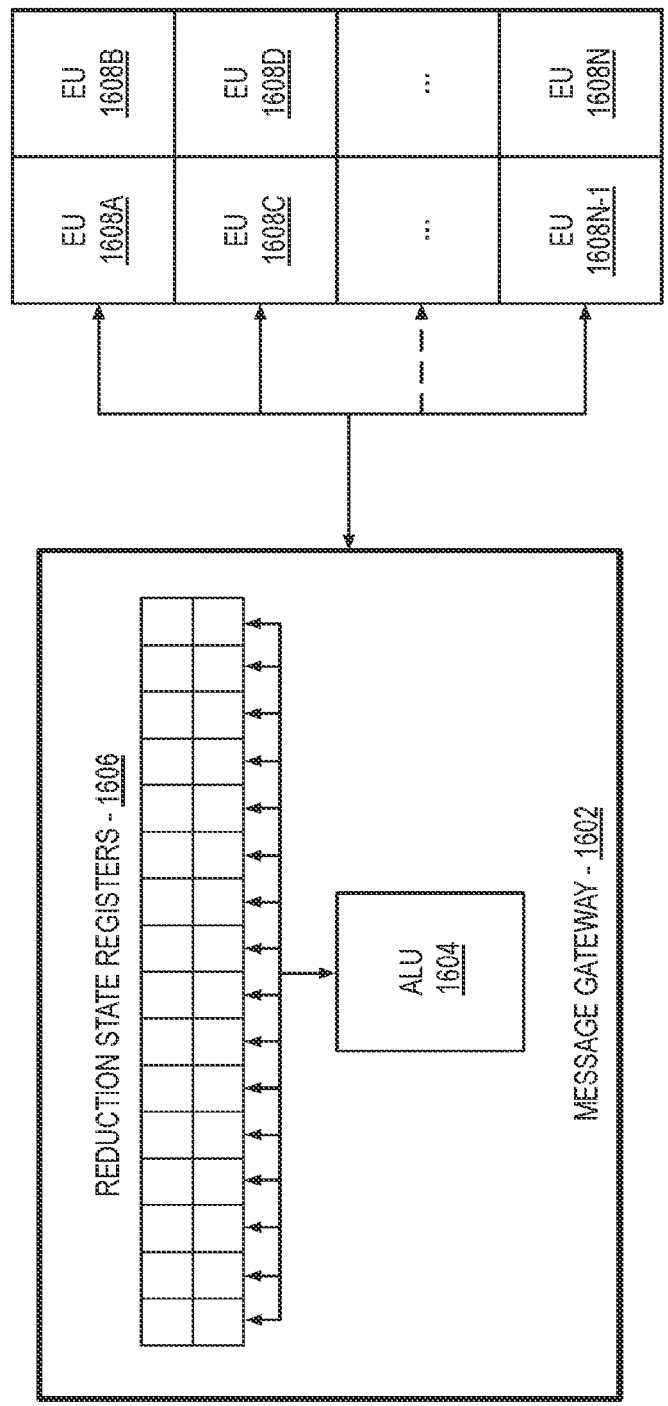
FIG. 16 is a block diagram of barrier_key logic for a reduce operation, according to an embodiment.

FIG. 16 is a block diagram of barrier_key logic for a reduce operation, 1600 according to an embodiment. In one embodiment, a graphics processor core includes shared functions including a message gateway 1602 that enables communication and synchronization between threads within a group of threads. The message gateway 1602 provides a mechanism for active thread-to-thread communication, enabling a requester thread to communicate with a recipient thread. In one embodiment the inter-thread communication is performed by enabling a requester thread to write into the register file of the recipient thread. The register write can be facilitated via message passing, in which the requester thread sends a message to the message gateway 1602 requesting a write to a register of the recipient thread. The message gateway 1602 can then send a write back message to the recipient thread to complete the register write on behalf of the requester thread.

Additionally, thread operations within a thread group can be synchronized via a barrier message. In one embodiment, a thread executing on an execution unit 1608A-1608N of a graphics processor core can use a barrier instruction to cause the execution unit to send a barrier message to the message gateway 1602 on behalf of the requesting thread. Each thread in a work group can cause a barrier message to be sent once the barrier instruction is reached. Once all threads have sent the barrier instruction, a write-back message is broadcast to all threads to indicate that the barrier operation is complete for all requesting threads.

In one embodiment the message gateway 1602 includes an arithmetic logic unit (ALU) 1604 including logic to perform the operation associated with a particular barrier_key function. The ALU 1604 includes logic to support each operation supported by the barrier_key function group, including add, subtract, OR, AND, XOR, min, max, variance, mean, product, and/or difference between minimum and maximum values. In one embodiment the ALU 1604 includes floating point logic to support floating point reduction operations.

A set of reduction state registers 1606 can be included within the message gateway to store reduction state data for the requested reduce operation. In one embodiment the reduction state registers 1606 can also store barrier state. For example, the message gateway can support multiple barrier identifiers to enable multiple outstanding barrier operations. Registers can be subdivided and assigned between the multiple barrier identifiers. In one embodiment, for each barrier identifier, a barrier counter for the identifier and reduction state data can be stored within the reduction state registers. In one embodiment the registers are configured to support up to an 8-bit barrier counter to support up to 256 threads in a thread group. In one embodiment, one or more 64-bit registers can be can be associated with each barrier identifier to store reduction state.

In some embodiments, each execution unit 1608A-1608N can decode a barrier_key instruction received from a thread and craft a barrier message to the message gateway 1602 based on the operation associated with the barrier_key instruction. In one embodiment, the EU can provide the source data and specify a operation in the payload of the barrier message sent to the message gateway 1602. The payload can specify one or more elements of source data, as well as an operation type to perform. An exemplary barrier message payload is shown in Table 3. It will be understood that the reduce barrier message payload of Table 3 is exemplary of one embodiment. Other embodiments may provide for a reduce barrier message having different fields or may provide for fields that are arranged in differing orders or have different data widths.

TABLE 3

Reduce Barrier Message Payload

| DWord | Bit | Description |
| --- | --- | --- |
| M0.7 | 31:0 | Reserved |
| M0.6 | 31:0 | Reserved |
| M0.5 | 31:0 | Reduction Source Data |
| M0.4 | 31:0 | Reduction Source Data |
| M0.3 | 31:0 | Ignored |
| M0.2 | 31 | Ignored |
|  | 30:28 | Ignored |
|  | 27:24 | BarrierID |
|  | 23:16 | Ignored |
|  | 15 | Barrier Count Enable |
|  | 14:8 | Barrier Count |
|  | 7:0 | Reduction Operation |
| M0.1 | 31:0 | Predicate Mask |
| M0.0 | 31:4 | Ignored |

In one embodiment a broadcast write back message is sent to all barrier requesters when all threads in the request group have synchronized. The reduction result can be sent to all threads using this broadcast write back message.

In one embodiment, in addition to the reduce barrier message of Table 3, a limited subset of the barrier_key function group can be implemented using barrier predicate logic associated with SIMD thread groups. In addition to or as an alternative to the reduce source data and reduction operation of the reduce barrier message payload of Table 3, the barrier message can include a predicate mask field, such as the predicate mask field at DWord M.01 of Table 3, which has a bit associated with each SIMD thread within a SIMD thread group. In one embodiment, a reduction using a 1-bit AND, OR, or XOR operation is supported using the predicate mask field to perform a barrier reduce operation to produce a 1-bit result. A broadcast write back message is sent to all requesting threads in the thread group upon synchronization. In one embodiment the broadcast write back message includes a predicated barrier mask sum, which is a sum of the predicate masks sent by each thread in the thread group. Kernel logic executing within threads can then perform comparison operations to determine a reduction result of the 1-bit AND, OR, or XOR operation. For example, the kernel logic can compare the predicated barrier mask sum field to 0 to perform an OR function, compare the predicated barrier mask sum to the workgroup size to perform an AND function, or compare the predicated barrier mask sum field bit zero to a value of 0 to perform an XOR function. For more complex reduction operations, the arithmetic logic unit (ALU) 1604 can be used.

Figure 17:
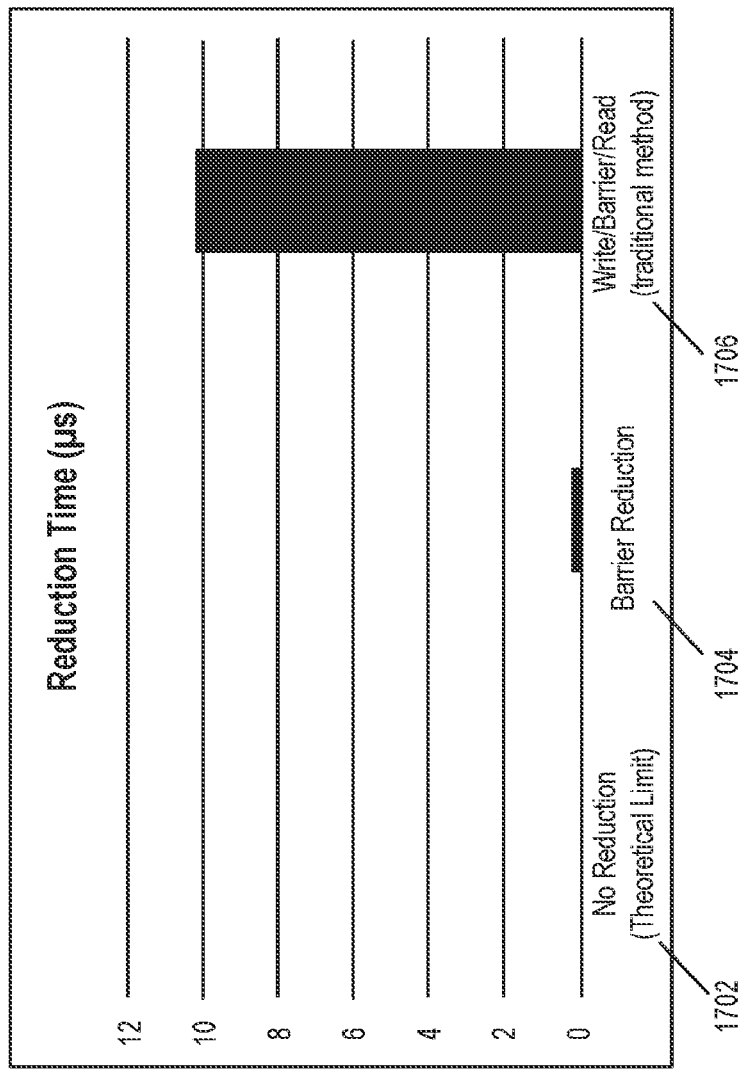
FIG. 17 is an chart showing a reduction time comparison between a traditional reduction operation and a barrier reduction operation, according to an embodiment.

FIG. 17 is an chart showing a reduction time comparison 1700 between a traditional reduction operation and a barrier reduction operation, according to an embodiment. By merging the reduction operation into the thread barrier operation, the time to perform a reduction operation can be significantly reduced. The reduction time comparison 1700 shows results of an exemplary LDPC decoder implementation. The theoretical limit 1702 for a reduction operation is zero microseconds. A traditional write/barrier/read reduction operation on the exemplary GPGPU implementation has an overhead of approximately 10 microseconds. However, using the same hardware implementation, reduction overhead is reduced to 0.2 microseconds, which is substantially similar to the theoretical limit of overhead reduction. This significant reduction in overhead is produced by the significant reduction in I/O among components of the processing logic that is caused by merging the reduce operation with the thread group barrier operation.

One skilled in the art will understand that the results shown in FIG. 17 are exemplary of one implementation of one embodiment and is not limiting, as the reduction overhead can vary based on processing logic and the complexity of the reduce operations to be performed.

Figure 18:
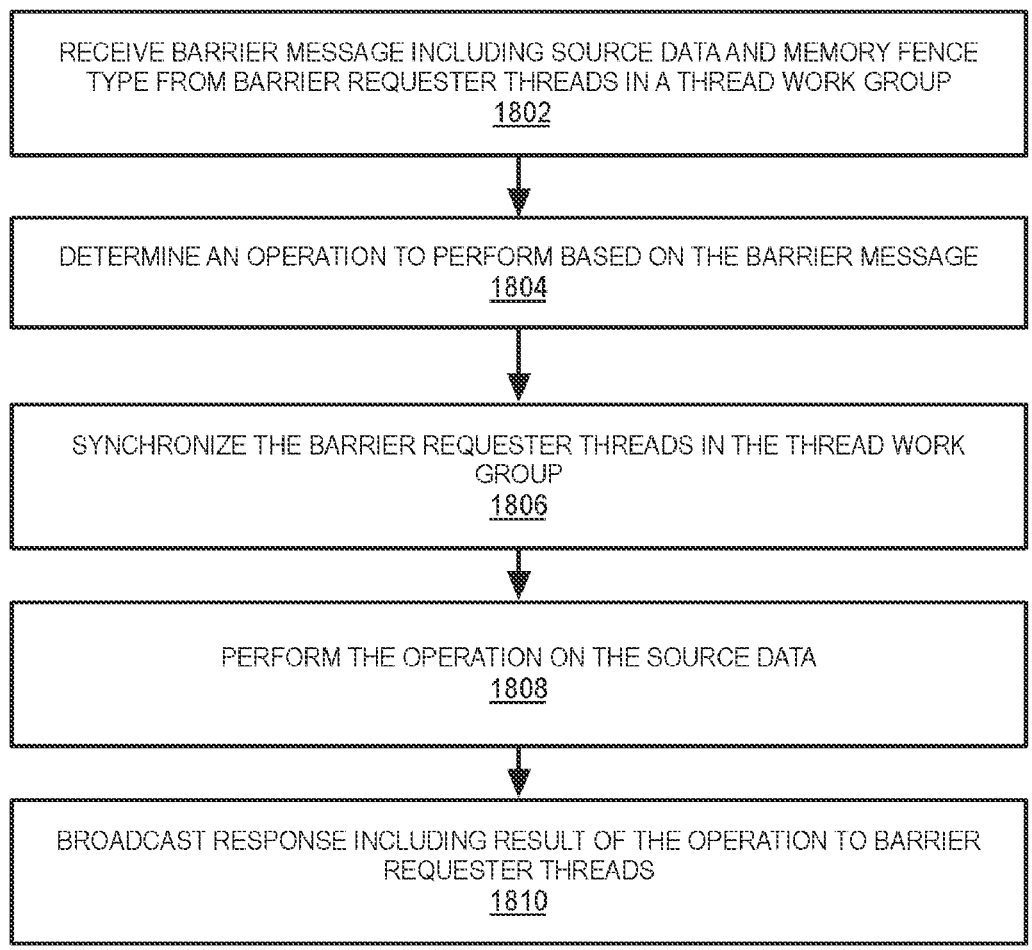
FIG. 18 is a flow diagram of barrier_key logic as performed within processing logic provided by an embodiment.

FIG. 18 is a flow diagram of barrier_key logic 1800 as performed within processing logic provided by an embodiment. The barrier_key logic 1800 can be performed by hardware logic such as the message gateway 1602 of FIG. 16, or any other form of inter-thread communication logic within a graphics core, graphics sub-core, or general-purpose computing device.

In one embodiment the barrier_key logic 1802 can receive a barrier message including source data and an optional memory fence type from a set of barrier requester threads in a thread work group. In one embodiment the logic can determine an operation to perform based on the barrier message, as shown at block 1804. For example, the barrier message can include a field within the message payload that explicitly specifies the barrier operation to be performed.

In one embodiment the barrier operation is specified by the requester, for example, based on the specific barrier_key instruction (e.g., work_group_barrier_add, work_group_barrier_sub, etc.) that is used to trigger the barrier message. However, other methods of specifying the operation to be performed may also be supported. For example, an embodiment can provide a generic barrier_reduce function to perform a barrier and reduce operation, where the barrier_reduce function specifies an operation or opcode in addition to operands.

The logic can synchronize the barrier requesters in the work group, as shown at block 1806. In one embodiment, the requesting threads will wait, sleep, yield, or otherwise cease execution while the barrier operation for the thread is pending, until each thread reaches the associated barrier. The barrier can also queue a memory fence to ensure correct ordering of memory operations to global or local memory. In one embodiment, a fence type of none (e.g., CLK_NONE_MEM_FENCE) can be specified, in which the barrier will bypass queuing of a memory fence.

At block 1808, the logic can perform the operation on the source data. In one embodiment the operation is not performed until all threads are synchronized at block 1806. In one embodiment, SIMD logic can then be used to perform the specified reduce operation across the set of source data. In some implementations, it may be possible to perform at least a portion of the operations between receipt of the first barrier message and receipt of the last barrier message for the thread group, such that some of the specified operations can be performed while the thread group is synchronizing. However, performing operations during work-group synchronization may be limited to a sub-set of operations.

Once the specified operation is performed on the source data at block 1808 and all requesting threads in a thread group are synchronized, the barrier_key logic 1800 can sent a broadcast response message including the result of the operation to the barrier requester threads, as shown at block 1810.

While embodiments of the barrier_key logic 1800 described herein is optimized for performing reduce operations in the context of the map and reduce programming model, one skill in the art will appreciate the broad applicability of such logic in any scenario in which a write/barrier/read would otherwise be used.

Figure 19:
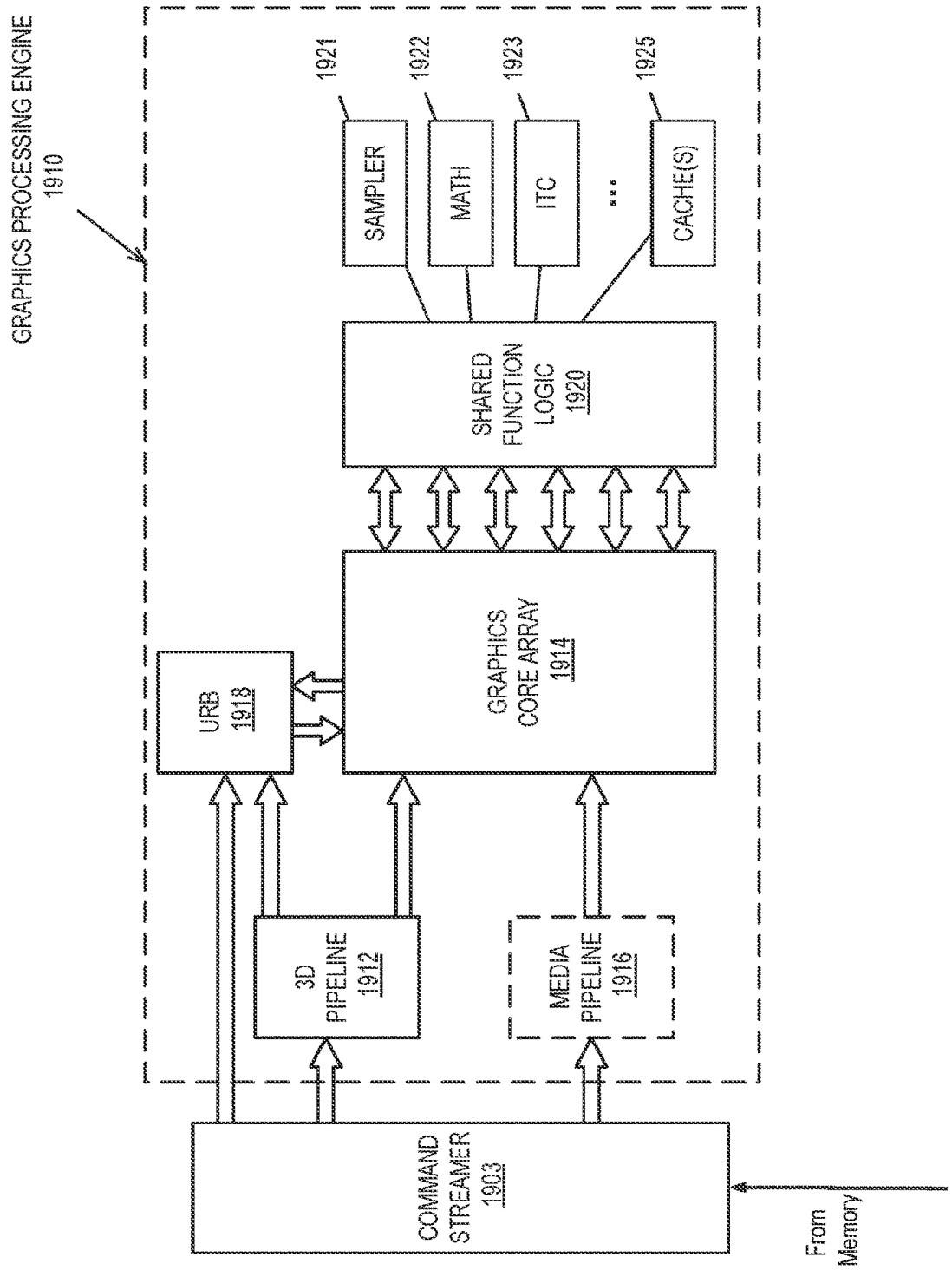
FIG. 19 is a block diagram of a graphics processing engine of a graphics processor in accordance with some embodiments.

FIG. 19 is a block diagram of a graphics processing engine 1910 of a graphics processor in accordance with some embodiments. In one embodiment, the graphics processing engine (GPE) 1910 is a version of the GPE 310 shown in FIG. 3. Elements of FIG. 19 having the same reference numbers (or names) as the elements of any other figure herein can operate or function in any manner similar to that described elsewhere herein, but are not limited to such. For example, the 3D pipeline 1912 and media pipeline 1916 may be versions of the 3D pipeline 312 and media pipeline 316 of FIG. 3. The media pipeline 1916 is optional in some embodiments of the GPE 1910 and may not be explicitly included within the GPE 1910. For example and in at least one embodiment, a separate media and/or image processor is coupled to the GPE 1910.

In some embodiments, GPE 1910 couples with or includes a command streamer 1903, which provides a command stream to the 3D pipeline 312 and/or media pipelines 316. In some embodiments, command streamer 1903 is coupled to memory, which can be system memory, or one or more of internal cache memory and shared cache memory. In some embodiments, command streamer 1903 receives commands from the memory and sends the commands to 3D pipeline 1912 and/or media pipeline 1916. The commands are directives fetched from a ring buffer, which stores commands for the 3D pipeline 1912 and media pipeline 1916. In one embodiment, the ring buffer can additionally include batch command buffers storing batches of multiple commands. The commands for the 3D pipeline 1912 can also include references to data stored in memory, such as but not limited to vertex and geometry data for the 3D pipeline 1912 and/or image data and memory objects for the media pipeline 1916. The 3D pipeline 1912 and media pipeline 1916 process the commands and data by performing operations via logic within the respective pipelines or by dispatching one or more execution threads to a graphics core array 1914.

In various embodiments the 3D pipeline 1912 can execute one or more shader programs, such as vertex shaders, geometry shaders, pixel shaders, fragment shaders, compute shaders, or other shader programs, by processing the instructions and dispatching execution threads to the graphics core array 1914. The graphics core array 1914 provides a unified block of execution resources. Multi-purpose execution logic (e.g., execution units) within the graphics core array 1914 includes support for various 3D API shader languages and can execute multiple simultaneous execution threads associated with multiple shaders.

In some embodiments the graphics core array 1914 also includes execution logic to perform media functions, such as video and/or image processing. In one embodiment, the execution units additionally includes general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-N as in FIG. 2.

In some embodiments, graphics core array 1914 is scalable, such that the array includes a variable number of graphics cores, each having a variable number of execution units based on the target power and performance level of GPE 1910. In one embodiment the execution resources are dynamically scalable, such that execution resources may be enabled or disabled as needed.

The graphics core array 1914 couples to shared function logic 1920 that includes multiple resources that are shared between the graphics cores in the graphics core array. The shared functions within the shared function logic 1920 are hardware logic units that provide specialized supplemental functionality to the graphics core array 1914. A shared function is implemented where the demand for a given specialized function is insufficient for inclusion within the graphics core array 1914. Instead, a single instantiation of that specialized function is implemented as a stand-alone entity in the shared function logic 1920 and shared among the execution resources within the graphics core array 1914. The precise set of functions that are shared between the graphics core array 1914 and included within the graphics core array 1914 varies between embodiments.

In various embodiments, shared function logic 1920 includes but is not limited to logic to implement sampler 1921, math 1922, and inter-thread communication (ITC) 1923 functionality. Additionally, some embodiments implement one or more cache(s) 1925 within the shared function logic 1920. In one embodiment the ITC logic 1923 includes a version of the message gateway 1602 of FIG. 16, including the ALU 1604 and reduction state registers 1606 of the barrier key logic for reduce operation 1600.

Figure 20:
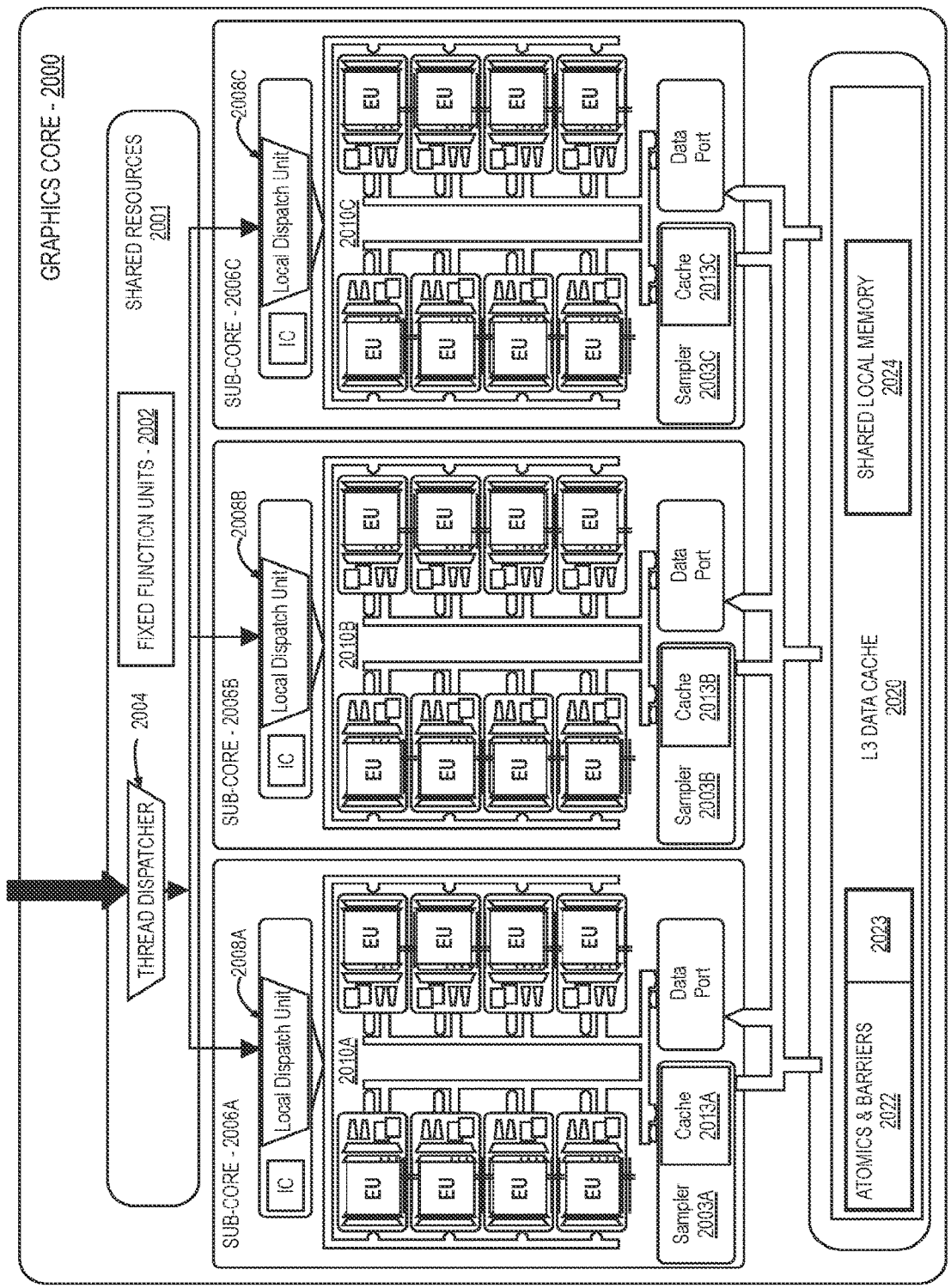
FIG. 20 is a detailed block diagram of graphics core logic, according to an embodiment.

FIG. 20 is a detailed block diagram of graphics core logic, according to an embodiment. In one embodiment the graphics core 2000 (e.g., slice) includes a cluster of sub-cores 2006A-2006C, which may be variants of the sub-cores 550A-550N. In one embodiment the graphics core includes shared resources 2001, such as the shared function logic 1920 of FIG. 19. However, in the illustrated embodiment each of the sub-cores 2006A-2006C includes sampler resources 2003A-2003C and a sampler cache 2013A-2013C. In one embodiment the shared resources 2001 include of a set of fixed function units 2002, for example, to support media, two-dimensional graphics functionality, and pixel back end operations. For programmable graphics and computational processing, a thread dispatcher 2004 can dispatch execution threads to the various sub-cores 2006A-2006C, where a local dispatch unit 2008A-2008C dispatches execution threads to the execution unit groups 2010A-2010C in each of the sub-cores. The number of execution units in each of the execution unit groups 2010A-2010C can vary among embodiments. Execution units within each group 2010A-C can also be dynamically enabled or disabled based on workload, power, or thermal conditions.

In one embodiment, a level-3 (L3) data cache 2020 is shared between each of the sub-cores 2006A-C. The L3 data cache, in one embodiment, is a variant of the L3 cache 1330 of FIG. 13. The L3 data cache 2020 can include an atomics & barriers unit 2022 and shared local memory 2024. The atomics & barriers unit 2022 includes dedicated logic to support implementation of barriers across groups of threads and is available as a hardware alternative to pure compiler or software based barrier implementations. The atomics & barriers unit 2022 also enables a suite of atomic read-modify-write memory operations to the L3 data cache 2020 or to the shared local memory 2024. Atomic operations to global memory can be supported via the L3 data cache 2020. In one embodiment, barrier logic within the atomics & barriers unit 2022 can work in concert with the message gateway 1602 of FIG. 16 to implement the barrier portion of the barrier_key logic. In one embodiment the atomics & barriers unit 2022 includes predicated barrier logic 2023, which can be configured to implement a subset of the operations supported by the barrier_key logic.

In one embodiment, the shared local memory 2024 supports programmer managed data for sharing amongst hardware threads, with access latency similar to the access latency to the L3 data cache 2020. In one embodiment, the shared local memory 2024 sharing is limited to between threads within the same sub-core 2006A-C, however, not all embodiments share such limitation.

Figure 21:
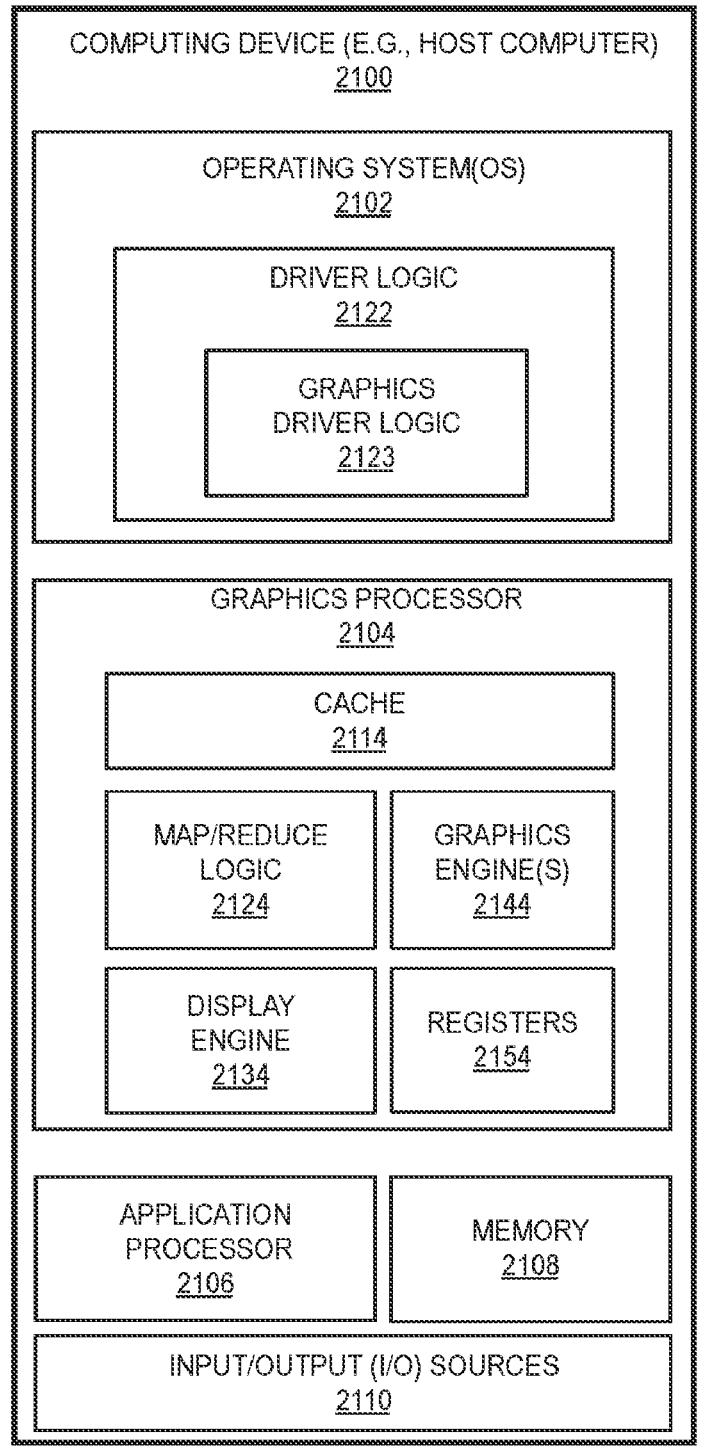
FIG. 21 is a block diagram of a computing device including a graphics processor, according to an embodiment.

FIG. 21 is a block diagram of a computing device 2100 including a graphics processor 2104, according to an embodiment. The computing device 2100 can be a computing device such as the data processing system 100 as in of FIG. 1. The computing device 2100 may also be or be included within a communication device such as a set-top box (e.g., Internet-based cable television set-top boxes, etc.), global positioning system (GPS)-based devices, etc. The computing device 2100 may also be or be included within mobile computing devices such as cellular phones, smart-phones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip.

The computing device 2100 includes a graphics processor 2104, which may be any graphics processor described herein. The graphics processor 2104 includes cache memory 2114. The cache memory 2114 can be one or more of a render cache, a sampler cache, a shared level-3 cache, and/or any other graphics processor cache descried herein. The graphic processor 2104 also includes map/reduce logic 2124 to perform map and reduce logic as described herein. The graphics processor also includes one or more graphics engine(s) 2144, which may include one or more instances of the graphics core 2000 of FIG. 20, or any graphics execution logic described herein, such as the execution logic 600 of FIG. 6. In one embodiment the map/reduce logic 2124 includes inter-thread communication logic for threads executing on the graphics engines 2144, such as the work_group_barrier_key function, to enable accelerated reduce operations across a thread group.

The graphics processor 2104 also includes a set of registers 2154, including control registers to configure and control operations for the graphics processor 2104. The graphics processor 2104 also includes a display engine 2134 to couple the graphics processor to a display device. Data that is processed by the graphics processor 2104 is stored in a buffer within a hardware graphics pipeline and state information is stored in memory 2108. The resulting image is then transferred to a display controller of the display engine 2134 for output via a display device, such as the display device 319 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 2104, the computing device 2100 may further include any number and type of hardware components and/or software components, such as (but not limited to) an application processor 2106, memory 2108, and input/output (I/O) sources 2110. The application processor 2106 can interact with a hardware graphics pipeline, as illustrated with reference to FIG. 3, to share graphics pipeline functionality. The application processor 2106 can include one or processors, such as processor(s) 102 of FIG. 1, and may be the central processing unit (CPU) that is used at least in part to execute an operating system (OS) 2102 for the computing device 2100. The OS 2102 can serve as an interface between hardware and/or physical resources of the computer device 2100 and a user. The OS 2102 can include driver logic 2122 for various hardware devices in the computing device 2100. The driver logic 2122 can include graphics driver logic 2123 such as the user mode graphics driver 1026 and/or kernel mode graphics driver 1029 of FIG. 10.

It is contemplated that in some embodiments, the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random access memory (RAM) (e.g., SDRAM, SRAM, etc.) comprising an application that makes use of the graphics processor 2104 to render a desktop or 3D graphics scene. A memory controller hub, such as memory controller hub 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2100 may be employed to observe gestures, record audio and video and to receive and transmit visual and audio commands.

I/O sources 2110 configured as network interface(s) can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2100 may vary from implementation to implementation depending upon numerous factors, such as price constraints, performance requirements, technological improvements, or other circumstances. Examples include (without limitation) a mobile device, a personal digital assistant, a mobile computing device, a smart-phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In general, embodiments described herein provide a system, method, and apparatus to accelerate reduce operations in a graphics processor. One embodiment provides an apparatus including one or more processors, the one or more processors including a first logic unit to perform a merged write, barrier, and read operation in response to a barrier synchronization request from a set of threads in a work group, synchronize the set of threads, and report a result of an operation specified in association with the barrier synchronization request.

One embodiment provides for a method of performing a work group barrier operation for a group of threads within a processing apparatus, the method comprising receiving a barrier message including source data from a set of barrier requester threads in a thread work group; determining an operation to perform based on the barrier message; synchronize the set of barrier requester threads in the thread work group; performing the operation on the source data; and broadcasting a response including a result of the operation to the set of barrier requester threads.

One embodiment provides for a computing device comprising first logic to execute multiple threads of a graphics processing operation and second logic to enable synchronization between the multiple threads via a merged write, barrier, and read operation. In a further embodiment the second logic is configured to perform a specified operation associated with the merged write, barrier, and read operation and report a result of the specified operation to the multiple threads, the specified operation including an arithmetic operation or a logical operation. In various embodiments, barrier predication logic or an arithmetic logic unit can be used to perform the specified operation.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
one or more processors to:
receive a barrier message associated with a barrier synchronization request, the barrier message including one or more source operands and an identifier of a specified operation; and
perform an operation including a merged write-barrier-read operation in response to the barrier synchronization request from a set of threads in a work group and synchronize the set of threads, wherein the merged write-barrier-read operation is performed to enable accelerated reduction operations associated with a set of map operations to write local data for global calculation, and the merged write-barrier-read operation is further performed to facilitate completion of atomic operations and ready the global calculations to determine one or more convergence conditions.

2. The apparatus of claim 1, wherein the one or more processors are further to report results associated with performance of the operation, wherein the results satisfying the one or more convergence conditions facilitate termination of iterations, wherein the results failing the one or more convergence conditions facilitate continuation of the iterations.

3. The apparatus of claim 1, wherein the one or more processors are further to report a result of the specified operation via a broadcast message to the set of threads after the set of threads are synchronized.

4. The apparatus of claim 1, wherein the barrier synchronization request includes a predicate mask.

5. The apparatus of claim 4, wherein the one or more processors are further to output a sum of predicate mask bits submitted by the set of threads.

6. The apparatus of claim 1, wherein the one or more processors are further to perform the specified operation including one or more of a minimum operation, a maximum operation, and a variance operation.

7. The apparatus of claim 1, wherein the one or more processors are further to receive a barrier message including a fence scope to specify a scope of a memory fence operation associated with a barrier synchronization request.

8. The apparatus of claim 7, wherein the fence scope associated with the barrier synchronization request includes one or more of a global scope or a local scope wherein the fence scope indicates no memory fence is associated with the barrier synchronization request.

9. A method comprising:
receiving a barrier message associated with a barrier synchronization request, the barrier message including one or more source operands and an identifier of a specified operation; and
performing an operation including a merged write-barrier-read operation in response to the barrier synchronization request from a set of threads in a work group and synchronizing the set of threads, wherein the merged write-barrier-read operation is performed to enable accelerated reduction operations associated with a set of map operations to write local data for global calculation, and the merged write-barrier-read operation is further performed to facilitate completion of atomic operations and ready the global calculations to determine one or more convergence conditions.

10. The method of claim 9, further comprising reporting results associated with performance of the operation, wherein the results satisfying the one or more convergence conditions facilitate termination of iterations, wherein the results failing the one or more convergence conditions facilitate continuation of the iterations.

11. The method of claim 10, further comprising reporting a result of the specified operation via a broadcast message to the set of threads after the set of threads are synchronized, wherein the barrier synchronization request includes a predicate mask.

12. The method of claim 11, further comprising outputting a sum of predicate mask bits submitted by the set of threads, and perform the specified operation including one or more of a minimum operation, a maximum operation, and a variance operation.

13. The method of claim 9, further comprising receiving a barrier message including a fence scope to specify a scope of a memory fence operation associated with a barrier synchronization request.

14. The method of claim 13, wherein the fence scope associated with the barrier synchronization request has a global scope, wherein the fence scope associated with the barrier synchronization request has a local scope, and wherein the fence scope indicates no memory fence is associated with the barrier synchronization request.

15. At least one non-transitory computer-readable medium having stored thereon instructions which, when executed, causes a computing device to perform operations comprising:
receiving a barrier message associated with a barrier synchronization request, the barrier message including one or more source operands and an identifier of a specified operation; and
performing an operation including a merged write-barrier-read operation in response to the barrier synchronization request from a set of threads in a work group and synchronizing the set of threads, wherein the merged write-barrier-read operation is performed to enable accelerated reduction operations associated with a set of map operations to write local data for global calculation, and the merged write-barrier-read operation is further performed to facilitate completion of atomic operations and ready the global calculations to determine one or more convergence conditions; and
reporting results associated with performance of the operation, wherein the results satisfying the one or more convergence conditions facilitate termination of iterations, wherein the results failing the one or more convergence conditions facilitate continuation of the iterations.

16. The at least one non-transitory computer-readable medium of claim 15, wherein the operations further comprise reporting results associated with performance of the operation, wherein the results satisfying the one or more convergence conditions facilitate termination of iterations, wherein the results failing the one or more convergence conditions facilitate continuation of the iterations.

17. The at least one non-transitory computer-readable medium of claim 16, wherein the operations further comprise reporting a result of the specified operation via a broadcast message to the set of threads after the set of threads are synchronized, wherein the barrier synchronization request includes a predicate mask.

18. The at least one non-transitory computer-readable medium of claim 17, wherein the operations further comprise outputting a sum of predicate mask bits submitted by the set of threads, and perform the specified operation including one or more of a minimum operation, a maximum operation, and a variance operation.

19. The at least one non-transitory computer-readable medium of claim 18, wherein the operations further comprise receiving a barrier message including a fence scope to specify a scope of a memory fence operation associated with a barrier synchronization request.

20. The at least one non-transitory computer-readable medium of claim 19, wherein the fence scope associated with the barrier synchronization request has a global scope, wherein the fence scope associated with the barrier synchronization request has a local scope, and wherein the fence scope indicates no memory fence is associated with the barrier synchronization request.

\* \* \* \* \*